(12) United States Patent
Grapsas

(10) Patent No.: US 10,809,697 B2
(45) Date of Patent: Oct. 20, 2020

(54) WIRE PATH DESIGN TOOL

(71) Applicant: Automated Industrial Machinery, Inc., Addison, IL (US)

(72) Inventor: Constantine Grapsas, Oak Brook, IL (US)

(73) Assignee: ADVANCED ORTHODONTIC SOLUTIONS, Tampa, FL (US)

( * ) Notice: Subject to any disclaimer, the term of this patent is extended or adjusted under 35 U.S.C. 154(b) by 0 days.

(21) Appl. No.: 15/926,795

(22) Filed: Mar. 20, 2018

(65) Prior Publication Data

US 2018/0267509 A1     Sep. 20, 2018

Related U.S. Application Data

(60) Provisional application No. 62/473,846, filed on Mar. 20, 2017.

(51) Int. Cl.
| | | |
|---|---|---|
| *G05B 19/4093* | (2006.01) | |
| *G05B 19/19* | (2006.01) | |
| *B21F 1/00* | (2006.01) | |
| *B21F 45/00* | (2006.01) | |

(52) U.S. Cl.
CPC ........ *G05B 19/40932* (2013.01); *B21F 1/008* (2013.01); *B21F 45/00* (2013.01); *G05B 19/19* (2013.01); *B21F 1/00* (2013.01); *B21F 45/008* (2013.01); *G05B 2219/35349* (2013.01); *G05B 2219/45167* (2013.01)

(58) Field of Classification Search
CPC ... G05B 19/40932; G05B 19/19; B21F 1/008; B21F 45/00; B21F 45/008
See application file for complete search history.

(56) References Cited

U.S. PATENT DOCUMENTS

| | | | |
|---|---|---|---|
| 5,431,562 A | 7/1995 | Andreiko | |
| 5,447,432 A | 9/1995 | Andreiko | |
| 5,454,717 A | 10/1995 | Andreiko | |
| 5,464,349 A | 11/1995 | Andreiko | |
| 5,474,448 A | 12/1995 | Andreiko | |
| 5,533,895 A | 7/1996 | Andreiko | |
| 5,683,243 A | 11/1997 | Andreiko | |
| 6,015,289 A | 1/2000 | Andreiko | |

(Continued)

FOREIGN PATENT DOCUMENTS

| | | |
|---|---|---|
| EP | 2204136 | 7/2010 |
| WO | 2008066891 | 6/2008 |

OTHER PUBLICATIONS

Kira, 3Ders, 3D printer and 3D printing news, "'A Leg That Fits': 3D modeling and 3D printing give prosthetics and fairings a personal touch", www.3ders.org, Sep. 22, 2015, pp. 1-13.

(Continued)

*Primary Examiner* — Vincent H Tran

(74) *Attorney, Agent, or Firm* — Fitch, Even, Tabin & Flannery LLP

(57) ABSTRACT

A system and a method is provided in which a CAD system receives a solid model and receives user input to select points on the surface of the solid model, to create a wire part program file based on the selected points, and to transmit the wire part program file to a bending machine. The wire part program files is configured such that the bending machine will manufacture a wire based on the wire part program file.

15 Claims, 15 Drawing Sheets

(56) References Cited

U.S. PATENT DOCUMENTS

| | | |
|---|---|---|
| 6,244,861 B1 | 6/2001 | Andreiko |
| 6,612,143 B1 | 9/2003 | Butscher |
| 6,616,444 B2 | 9/2003 | Andreiko |
| 6,632,089 B2 | 10/2003 | Rubbert |
| 6,648,640 B2 | 11/2003 | Rubbert |
| 6,732,558 B2 | 5/2004 | Butscher |
| 6,732,559 B2 | 5/2004 | Gasparini |
| 6,733,289 B2 | 5/2004 | Manemann |
| 6,846,179 B2 | 1/2005 | Chapouland |
| 7,013,191 B2 | 3/2006 | Rubbert |
| 7,029,275 B2 | 4/2006 | Rubbert |
| 7,077,646 B2 | 7/2006 | Hilliard |
| 7,080,979 B2 | 7/2006 | Rubbert |
| 7,094,053 B2 | 8/2006 | Andreiko |
| 7,155,373 B2 | 12/2006 | Jordan |
| 7,156,655 B2 | 1/2007 | Sachdeva |
| 7,229,282 B2 | 6/2007 | Andreiko |
| 7,275,930 B2 | 10/2007 | Taub |
| 7,291,011 B2 | 11/2007 | Stark |
| 7,354,268 B2 | 4/2008 | Raby |
| 7,361,018 B2 | 4/2008 | Imgrund |
| 7,474,307 B2 | 1/2009 | Chishti |
| 7,585,172 B2 | 9/2009 | Rubbert |
| 7,590,462 B2 | 9/2009 | Rubbert |
| 7,717,708 B2 | 5/2010 | Sachdeva |
| 7,831,322 B2 | 11/2010 | Liu |
| 7,993,133 B2 | 8/2011 | Cinader, Jr. |
| 8,021,147 B2 | 9/2011 | Sporbert |
| 8,121,718 B2 | 2/2012 | Rubbert |
| 8,145,340 B2 | 3/2012 | Taub |
| 8,359,114 B2 | 1/2013 | Steingart |
| 8,417,366 B2 | 4/2013 | Getto |
| 8,439,672 B2 | 5/2013 | Matov |
| 8,452,436 B2 | 5/2013 | Pattijn |
| 8,465,280 B2 | 6/2013 | Sachdeva |
| 8,469,705 B2 | 6/2013 | Sachdeva |
| 8,517,727 B2 | 8/2013 | Raby |
| 8,690,568 B2 * | 4/2014 | Chapoulaud ............ A61C 7/00 433/24 |
| 8,734,150 B2 | 5/2014 | Chishti |
| 8,849,015 B2 | 9/2014 | Bodony |
| 8,998,608 B2 | 4/2015 | Imgrund |
| 9,125,709 B2 | 9/2015 | Matty |
| 2003/0152884 A1 * | 8/2003 | Wiechmann ............ A61C 7/002 433/9 |
| 2004/0072120 A1 * | 4/2004 | Lauren ............ A61C 7/20 433/24 |
| 2004/0197728 A1 | 10/2004 | Abolfathi |
| 2004/0243361 A1 | 12/2004 | Steuben |
| 2007/0243502 A1 | 10/2007 | Wen |
| 2008/0261165 A1 | 10/2008 | Steingart |
| 2009/0113969 A1 * | 5/2009 | Buckley ............ B21F 1/00 72/14.8 |
| 2010/0114538 A1 * | 5/2010 | Sporbert ............ A61C 7/00 703/1 |
| 2010/0291505 A1 | 11/2010 | Rawley |
| 2011/0267337 A1 | 11/2011 | Getto |
| 2011/0268327 A1 | 11/2011 | Getto |
| 2012/0123577 A1 * | 5/2012 | Chapoulaud ............ A61C 7/00 700/98 |
| 2012/0322019 A1 | 12/2012 | Lewis |
| 2013/0204583 A1 | 8/2013 | Matov |
| 2014/0067334 A1 | 3/2014 | Kuo |
| 2014/0067335 A1 | 3/2014 | Andreiko |
| 2014/0076015 A1 | 3/2014 | Riemeier |
| 2014/0172375 A1 | 6/2014 | Grove |
| 2014/0294273 A1 | 10/2014 | Jaisson |
| 2014/0379356 A1 | 12/2014 | Sachdeva |
| 2015/0366637 A1 | 12/2015 | Kopelman |
| 2016/0135926 A1 * | 5/2016 | Djamchidi ............ A61B 6/032 433/3 |

OTHER PUBLICATIONS

Rohit C.L. Sachdeva, JCO, Inc., "SureSmile Technology in a Patient-Centered Orthodontic Practice", vol. XXXV No. 4, Apr. 2001, pp. 245-253.

AC Beers et al., "Computer-assisted treatment planning and analysis," Orthodontics & Craniofacial Research, vol. 6, Issue Supplement s1, pp. 117-125, Aug. 2003.

Dan Gauer at al., "Computer-Aided Design/Computer-Aided Manufacturing Technology in Customized Orthodontic Appliances," Journal of estetic and restorative Dentistry, vol. 24, No. 1, 2012, http://grauersmiles.com/pdfs/JERD%2024-1-1.pdf.

Dirk Wiechmann et al., "Customized brackets and archwires for lingual orthodontic treatment," American Journal of Orthodontics and Dentofacial Orthopedics, vol. 124, Issue 5, pp. 593-599, Nov. 2003.

F. Sassania et al., "Computer-assisted fabrication of orthodontic appliances," Computers in Industry, vol. 29, Issue 3, pp. 179-195, Aug. 1,1996.

* cited by examiner

WIRE PATH DESIGN TOOL

This application claims the benefit of U.S. Provisional Application No. 62/473,846 filed Mar. 20, 2017, which is incorporated by reference in its entirety herein.

FIELD OF THE INVENTION

This invention relates generally to wire bending and automated wire bending machines. More particularly this invention relates to software for defining a wire shape part program file used to generate a wire using a wire bending machine.

BACKGROUND OF THE INVENTION

Automated wire bending machines are used to create accurate and complex bends in wires made from a variety of materials, cross-sectional shapes, and sizes. Automated wire bending machines may be operated, for example, through computer numerical control (CNC). CNC wire bending machines allow a user to design a wire shape using a computer or other processing device and have the machine create the shape consistently according to instructions in a part program file. By automating the wire-forming process, complicated parts can be made beyond the capabilities of ordinarily skilled human craftsmen. Further, CNC wire bending machines may be used to create precise parts repeatedly, reducing the need to inspect or rework individual parts.

A variety of automated wire benders are known in the art. These include two-dimensional machines, in which the finished wire is substantially flat because each bend forms the wire in a single plane; and three-dimensional machines, in which the finished wire is more complex and may have bends defining multiple planes in space.

The wire bending machines known in the art generally include a wire feeding mechanism, a clamping mechanism, a bending mechanism, and a cutoff mechanism. The wire feeding mechanism feeds wire into the bending mechanism. Once the wire is in the correct position at the wire bending mechanism, the clamping mechanism secures the wire while the bending mechanism bends the wire. By repeating the steps of feeding the wire to a selected position and bending the wire to a selected angle, the wire bending machine creates an intricate series of bends in the wire. Three-dimensional wire bending machines also include a means for rotating the wire relative to the bending mechanism. Certain known three-dimensional wire bending machines include a means for rotating the bending mechanism relative to the wire. By rotating the wire or the bending mechanism, a three-dimensional wire shape may be formed by changing the orientation of the wire relative to the bending mechanism at each bending location. This process is repeated until the wire has been bent into its final position. After the wire is bent into its final position, the cutoff mechanism cuts the wire.

In automated (e.g., CNC) wire bending machines, the wire feeding mechanism, clamping mechanism, means for rotating, bending mechanism, and cutoff mechanism are each driven by one or more actuators through a series of sequential operations defined in a part program. The actuators may be servo motors, stepper motors, hydraulic or pneumatic cylinders, or any other device that may be commanded electronically through circuits integrated with a computing device. Each actuator may further be associated with one or more feedback devices that provide position information associated with the respective actuator. These feedback devices might include encoders, resolvers, limit switches, proximity switches, or any other device that provides position data electronically through circuits integrated with a computing device.

Automated wire bending machines use a part program file to define a series of operations that, performed in sequence, will form a wire. Each part program file defines a series of steps to be performed by an automated wire bending machine. The steps of the part program include commands and data. Commands instruct the wire bending machine performs a particular operation, for example to feed, rotate, bend, or cut the wire. Data provides information including how far to feed the wire, how far to rotate the wire, what angle to bend the wire, or what tool to use to bend the wire. The contents of the part program file may depend upon the capabilities of the wire bending machine. For two-dimensional wire bending machines, the part program file may include only a feed length and a bend angle for each step in the part program. More sophisticated wire bending machines may incorporate multiple bending tools, such that a bend radius needs to be defined for each step in the part program. Likewise, three-dimensional wire bending machines require a rotation to be defined for each step in the part program. Commands and data in a given part program file format may be defined explicitly by including information, or implicitly by relying on prior steps to define commands or data for subsequent steps.

Software tools may be used to generate part programs files. Each bending step in a part program file includes instructions defining a length of wire to feed through the machine and a bend angle. In part program files for more sophisticated wire bending machines each bending step may further include instructions defining a bend radius and the rotational angle of the bending head relative to the wire. Non-bending steps may also be included in a part program, for example with instructions that command the wire bending machine to cut the wire.

While known wire bending machines are capable of forming complex wire shapes, the design of those shapes remains difficult. Visualizing a complex wire shape is difficult and non-intuitive for most people. This is particularly true for three-dimensional wire shapes, which include bends in many different orientations. Using a computer to display the wire shape on a screen is therefore known in the art as an aid in the design process. This allows the person programming the part to visualize each step required to form the wire and to verify that the wire shape will not collide with the wiring bending machine during fabrication. Generating a part program is therefore simplified by using a software tool that can display the wire shape on the screen of a computer. But selecting dimensions and defining the shape of the wire remains a non-intuitive process. Unless the wire has been designed in advance with predefined dimensions, it is difficult to generate a part program with the desired shape output. Even editing a predefined shape is challenging because it is frequently difficult to identify the step and dimensions that will change the wire shape in the desired way. The process of designing and editing wire shapes therefore typically requires a substantial amount of trial and error, in which the person designing the part program iteratively generates a wire shape and then modifies the wire shape to make the wire shape to fit a given geometry.

The difficulties of designing a wire shape are particularly acute when the wire is intended to fit to a pre-existing three-dimensional shape. Tools are needed to simplify or eliminate the need to measure the dimensions of the preexisting shape so that a wire shape can be designed without the trial and error process characteristic of the known processes. For example, in the field of orthodontics it is desirable to create wires for orthodontic appliances that will fit the shape of the patient's mouth. Much of the difficulty in generating such wires lies in collecting the correct measurements such that the final wire shape will correctly fit the overall shape of the patient's mouth.

Further, tools are needed to generate part programs that can be used to form a wire around existing structures. For example, when creating part programs for orthodontic wires, tools are needed that calculate wire forming steps in relation to the shape of orthodontic features such as teeth. Even with accurate measurements, designing the wire to the patient's mouth remains challenging. Archwires typically include complicated three-dimensional shapes. As discussed above, programming three-dimensional shapes for a wire bending machine is non-intuitive and programming a wire bending machine to generate an archwire that will fit the unique shape of a patient's mouth is therefore quite difficult.

In addition, visualization tools are needed to illustrate the wire shape to be formed in relation to a pre-existing three-dimensional shape. Tools are needed to place the wire shape in the correct orientation relative to the pre-existing shape. This allows the user of the system to manipulate the wire shape and the pre-existing shape to visually evaluate the fit of the wire to the pre-existing shape. Similarly, once the wire shape is properly oriented the computer displaying the wire shape and the pre-existing shape can be used to perform automated collision detection. Thus, visualization is improved by providing a representation on the computer screen of the pre-existing three-dimensional shape, with a proposed wire shape at the correct orientation relative to the shape. Existing tools require manipulation of the wire shape to orient it relative to the pre-existing shape.

SUMMARY

Generally speaking and pursuant to the various embodiments described below, a system is provided comprising a CAD system configured to receive a solid model, and further configured to receive input from an input device, to present a representation of a wire via a display device based on the input, to create a wire part program file based on the input, and to transmit the wire part program file to a bending machine. The bending machine is configured to receive the wire part program file from the input device and to manufacture a wire based on the wire part program file. In one example, the wire is an orthodontic arch wire.

Further pursuant to these various embodiments, a method for generating a wire part program file is provided herein. The wire part program file is used by a wire bending machine to generate a wire. The method includes the steps of receiving a solid model file, displaying a representation of the solid model file, and receiving user input identifying at least three points on a surface of the solid model file. The points selected by the user are used to generate a wire shape. The method further comprises calculating a point in space for each of the at least three points on the surface of the solid model file, the point in space located at a predetermined distance normal to the surface of the solid model at the respective point. In this way, the wire shape is defined with an offset distance relative to the surface of the solid model. A wire part program file is generated from the wire shape defined using the user inputs. The wire part program file may include instructions that define the wire itself or instructions that command a wire bending machine to perform certain functions. In some examples, the wire is an orthodontic arch wire. Further, the solid model may be a model of a patient's mouth. The selected points may be locations on the surface of the patient's teeth.

The method further includes displaying a representation of a wire that passes through the point in space for each of the at least three points, alongside the representation of the solid model file; and generating, based on the user input, a wire part program file. In another described example, the step of displaying representations of the solid model file and the wire shape further includes automatically identifying collisions between the wire shape and the solid model file. This allows the user of the system to identify errors in the wire shape before the wire part program file is used to generate a wire. In one described example, the method further includes exporting the wire part program file to the wire bending machine; and forming a wire based on the wire part program file.

In another described example, the wire shape is based on a preexisting template. This allows the user of the system to adjust a template design to match the unique geometry of the patient's mouth. In this example, the at least three points on the surface of the solid model file correspond to features in the preexisting template.

Further pursuant to these various embodiments, a method for generating a wire is provided herein. The method includes steps of receiving a solid model, which in some examples is a solid model of a patient's mouth. The method further includes receiving user input identifying a first point, a second point, and a third point on a surface of the solid model. The user input is used to identify points on the solid model that the wire will pass close by.

The method further includes calculating a continuous wire shape based on the first point, second point, and third point. In some examples the calculating step further requires calculating a point in space, at a predetermined distance normal to the surface of the solid model respectively at each of the first point, second point, and third point on the surface of the solid model. Each of the calculated points in space provide a point through which the wire will pass. In a preferred example, the wire is an orthodontic archwire and the solid model is a model of a patient's mouth. In this example, the selected points are locations on the surface of the patient's teeth and the predetermined distances compensate for the space that would be occupied by a bracket that will secure the archwire to the tooth. In one example of the method, calculating a continuous wire shape further includes calculating a length of straight wire between the first point and the second point, based on a predetermined bend radius associated with the second point; and calculating a bending angle associated with the second point, based on the first point and the third point. The predetermined distance may be unique to each of the selected points, or may be common to all of the selected points. In one example, software allows the user to edit each point and modify the predetermined distance individually for each point.

The method further includes presenting, via a display device, a representation of the continuous wire shape and a representation of the solid model file. By showing a representation of the solid model file along with a representation of the wire, the method allows the user to review how the wire fits relative to the solid model. The user can then modify the selected points and the predetermined distance as necessary to adjust the fit of the wire relative to the solid model. This reduces the need for trial and error with a physical wire.

The method further includes generating a part program file comprising a series of steps required to form the continuous wire shape. As described above, the part program contains a series of steps where each step instructs the wire bending machine to perform feed, rotation, bending, or cut-off operations. In one example, the series of steps comprising the part program includes one or more steps defining a length of wire to feed, a bending radius to apply to the wire, and a bending angle for each of the first point, second point, and third point. In other examples, the part program file provides a series of commands used to move one or more actuator in an automated wire bending machine. The method further includes exporting the part program file to a wire bending machine and forming the wire by the wire bending machine according to the series of steps.

Further pursuant to these various embodiments, a system for generating a wire part file is provided herein. The system includes a display device configured to display a representation of a solid model and a representation of a wire; a user input device configured to operate in conjunction with the display device to allow a user to select a point on a surface of the representation of the solid model; a processor device configured to calculate a point in space located a predefined distance from the surface of the representation of the solid model, and further configured to generate the representation of the wire for display on the display device, wherein the wire shape passes through the point in space; an output port configured to transmit a part program comprising a series of steps each providing a length of wire, a bend angle, and a bend radius associated with the point on the surface of the representation of the solid model.

In one example, the output port is operably coupled to a wire bending machine configured to generate a physical wire corresponding to the representation of the wire by performing operations corresponding to the series of steps.

In addition to the above-mentioned embodiments, it should be understood that a variety of methods are also disclosed herein. For example, pursuant to these various embodiments a method of manufacturing a wire is provided comprising receiving an input from an input device, presenting a representation of a wire shape via a display device based on the input, creating a wire part program file based on the input, transmitting the wire part program file to a bending machine via a communications network, and manufacturing a wire based on the wire part program file by the bending machine. These and other methods related to the subject matter set forth herein are intended to be covered by this disclosure. It should also be understood that while certain features have been described with certain embodiments, these features may be intermixed or interchanged with one another to form other embodiments as desired. All features disclosed herein are intended to be used in any of the embodiments disclosed herein either in lieu of similar features or in combination with other features.

BRIEF DESCRIPTION OF THE DRAWINGS

This description includes drawings, wherein.

Figure 1:
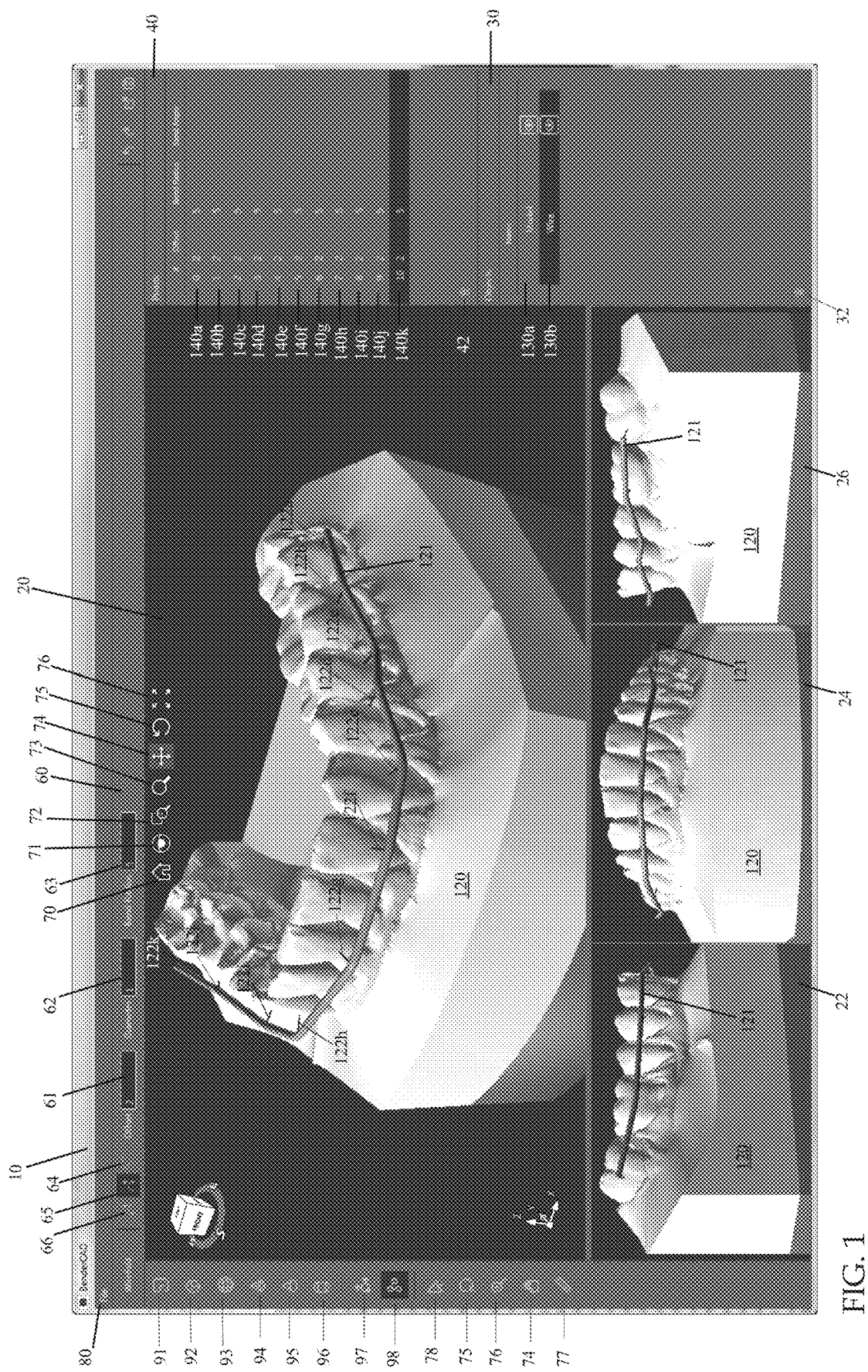
FIG. 1 illustrates an exemplary screen from the user interface of a CAD system, showing a solid model and a wire shape designed to fit the solid model.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one embodiment, a computer aided design ("CAD") system is configured to simplify the design of a wire shape, by automatically fitting a wire to an existing solid model and then exporting a part file for a wire bending machine. Previously known systems did not have the capability to design a wire in this manner. Instead, wires are designed using known systems in a segment-by-segment fashion or by providing machine instructions and then observing the resulting wire shape.

The disclosed CAD system uses an existing three-dimensional solid model and effectively traces the wire along the surface of the solid model, by calculating points relative to the surface of the solid model based on points selected by a user. The CAD system connects the calculated points with wire segments and then automatically generates a part program file for a wire bending machine. The CAD system therefore makes it possible to rapidly design and form a physical wire from an existing solid model. The solid model may be any CAD file known in the art, capable of storing three-dimensional solid shape. Known CAD tools are capable of creating such three-dimensional solid models, including SolidWorks™, AutoCAD™, and Pro/ENGINEER™. These CAD tools generate known file-types including .STL, .STP, and .IGES files. Other file-types are also available, including proprietary solid model file-types and other open-source file-types used to interchange solid models between different CAD tools. The CAD system may also generate the solid model from predefined primitives including cubes, spheres, pyramids, cones, or cylinders. In a preferred embodiment, the existing solid model represents jaw and tooth shape data captured from the mouth of an orthodontic patient. In some examples, the model reflects desired positions and orientations for the teeth within the patient's mouth, the positions and orientations of individual teeth having been manipulated by an orthodontist to reflect positions that will result after treatment.

FIGS. 1-5 illustrate a user interface for the CAD system, with like numbers indicating the same feature across the drawings. The CAD system includes a user interface window 10 that includes sub-panels with specific content, including object list pane 30, points list pane 40, a file menu 80, and wire editing pane 60. The user interface 10 also includes multiple panes showing a representative of the solid model and the wire, including the main display 20, left side view display 22, front view display 24, and right side view display 26. The CAD system relies upon certain features provided by known development environments, for example graphical design tools and interfaces to the operating system on a general purpose computer. In a preferred embodiment, the CAD system is created using tools available in Microsoft Visual Studio software. The display panes (20, 22, 24, and 26) may be generated using OpenGL or other three-dimensional rendering tools known in the art, which provide certain functions related to generating, displaying, and manipulating three-dimensional objects on a computer screen. In a preferred embodiment, an OpenGL toolkit such as Eyeshot, provided by devDept Software S.a.s. may be used to generate, display, and manipulate three-dimensional objects on the screen of a general purpose computer.

FIG. 1 illustrates a user interface 10 for the CAD system, showing a solid model for a lower jaw 120, a wire 121, and selected points 122a-122k that define the shape of the wire 121. At the upper right side of the CAD system user interface window 10, the points list pane 40 allows the user to select any of the points 140a-140k selected to form the wire 121. At the lower right side of the CAD system window 10, the object list pane 30 allows the user to select the objects 130a and 130b. The object 130a is a pre-existing solid model. Clicking on the model object 130a selects the model object 130a so the user can choose to remove the solid model from the display, for example by clicking on the garbage can icon 32 at the bottom of the object list pane 30. When the solid model object 130a is selected, the points list pane 40 will be blank, because no points are associated with the solid model object 130a.

The object 130b is the wire 121. By clicking on the wire object 130b the user selects the wire object 130b. The selected points 140a-140k associated with the wire 121 are then displayed in the points list pane 40. The user may click on any of the selected points 140a-140k to select that point for editing. The user can choose to remove the selected point, for example by clicking on the garbage can icon 42 at the bottom of the object list pane 30.

Figure 2B:
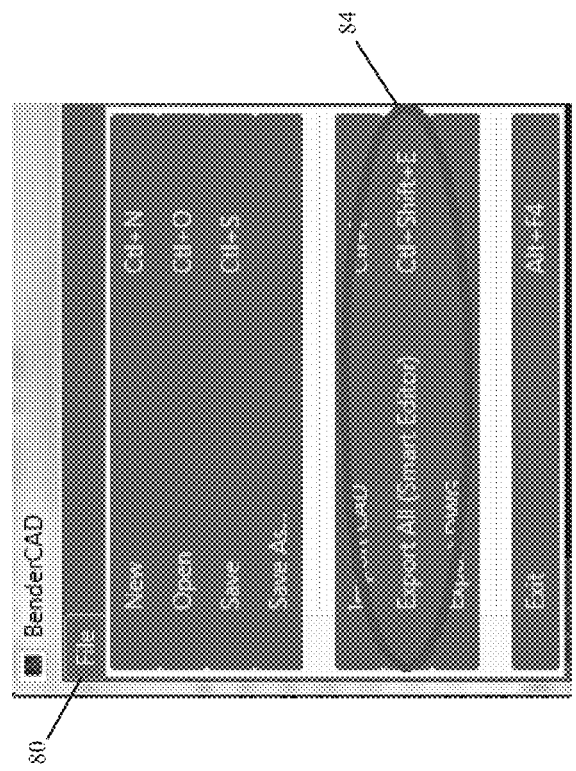
FIGS. 2A and 2B illustrate exemplary menus available for importing a solid model or exporting a part program file.
Figure 2A:
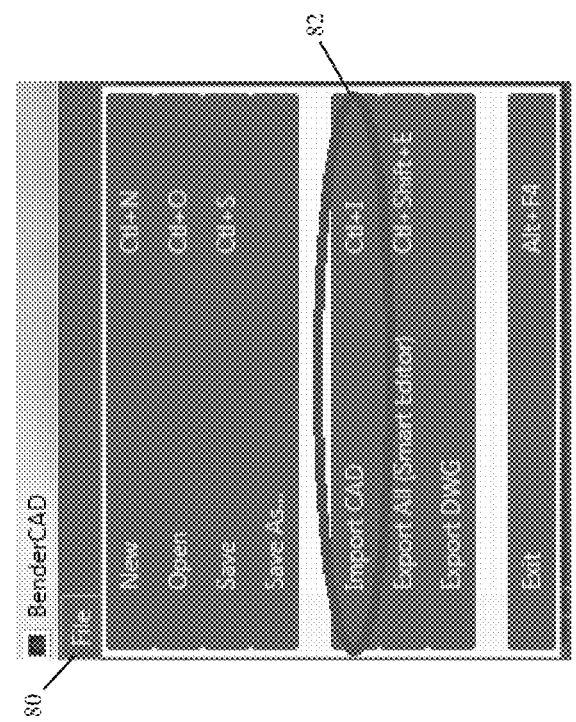

The file menu 80 allows the user to select from menu functions illustrated in FIGS. 2A and 2B. The Import CAD menu item 82 allows the user to import a solid model through typical operating system dialog windows. Similarly, the Export All (Smart Editor) menu item 84 allows the user to export the wire bending machine instructions for all wires defined in the CAD system.

With reference again to FIG. 1, the main display pane 20 includes a series of display image manipulation buttons 70-78. These buttons give the user the ability to manipulate the objects displayed in the main display pane, using functions typical for solid modelling CAD tools. The home button 70 returns the display window to standard isometric view. The button 71 puts the cursor into magnifying glass mode, causing it to display a magnified view of a portion of the display beneath the mouse cursor. The zoom window button 72 places the main display pane 20 into a mode so the user can click and drag the mouse cursor to create a window. When the user releases the mouse button the portion of the displayed objects within the created window will be enlarged to fill the main display window. The zoom button 73 allows the user to zoom in or out by clicking and dragging the mouse cursor toward or away from the middle of the main display window 20. The pan buttons 74 allow the user to click and drag to translate the display side to side. The rotate buttons 75 allow the user to spin the objects displayed in the main display pane 20, so that the user can view them in different orientations and look at the relation of each object to the others. The zoom buttons 76 allow the user to zoom in or out by clicking and dragging the mouse cursor toward or away from the middle of the main display window 20. The ruler button 77 allows the user to measure a distance between two selected points on the representation in the main display window 20. The arrow button 78 allows the user to select any object represented in the main display window 20 by clicking on the object. After selecting the arrow button 78, the user may click on a displayed element to select a solid model (either imported or user-generated), a wire, or a selected point.

Figure 3:
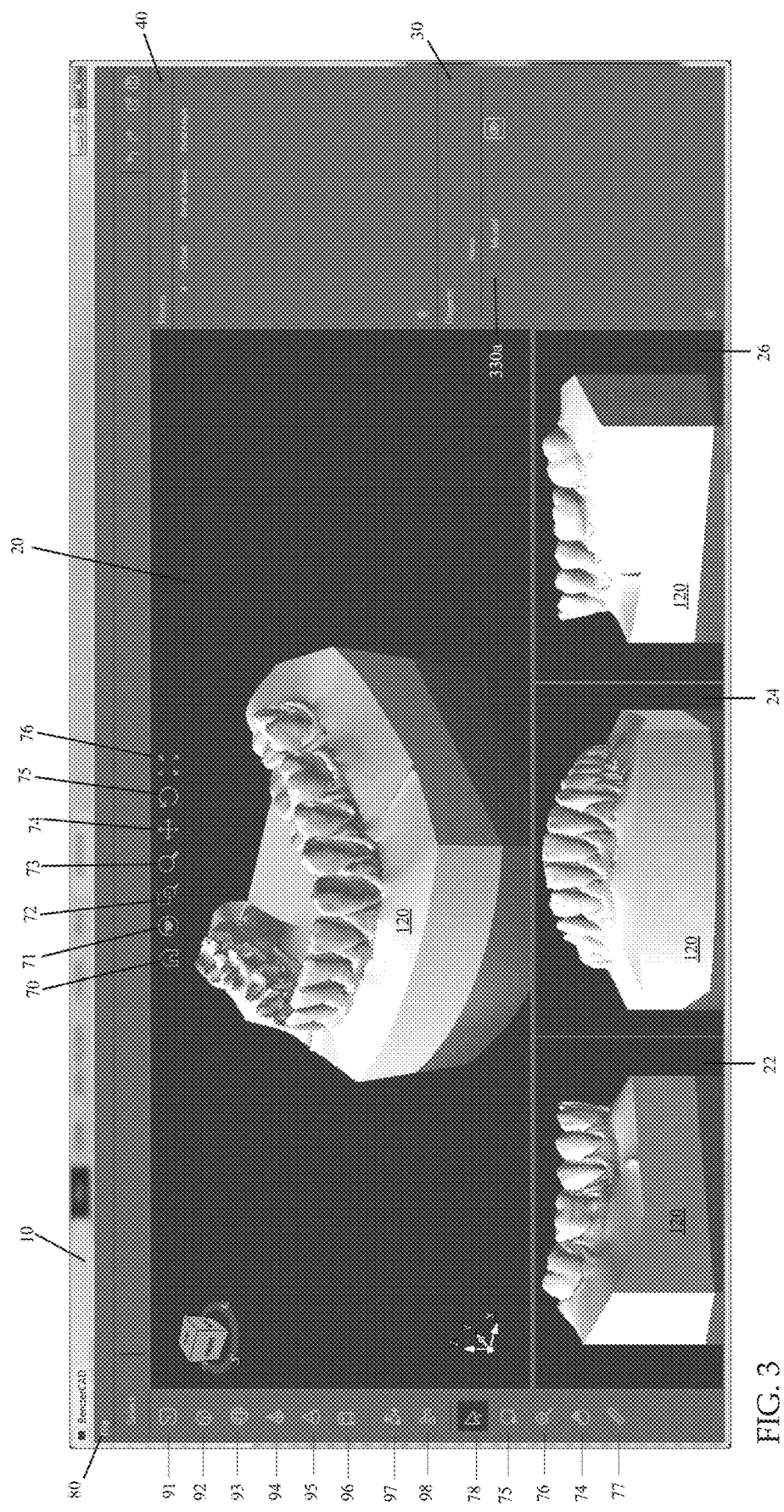
FIG. 3 illustrates an exemplary screen from the user interface of a CAD system, showing only a solid model.

FIG. 3 illustrates the CAD system user interface 10 in a state when a solid model 120 has been imported, but no points have been selected for generating a wire. The object list pane 30 includes a single object 330a corresponding to the solid model 120. The points list pane 40 is empty because no points have been selected.

In addition to importing a solid model from a file, the CAD system allows the user to generate one or more solid models from predefined primitives, using buttons 92-96 to invoke functions that define such primitives. The button 92 allows the user to draw a rectilinear prism (e.g., a cube or a rectangular prism) with user definable dimensions. Similarly, the button 93 allows the user to draw a sphere, the button 94 allows the user to draw a pyramid, the button 95 allows the user to draw a cone, and the button 96 allows the user to draw a cylinder.

After receiving a solid model, the CAD system displays the solid model 120 on the screen. The solid model is typically a collection of points on the surface of the object 120. Generating, displaying, and manipulating such objects on a computing device is accomplished in part using known tools such as an OpenGL toolkit, as discussed above. The OpenGL toolkit provides certain data structures and certain vector math functions such that the CAD system can be designed to include the inventive features and functionality described herein. The surface of the solid model is typically defined as a polygon within a plane, having vertices defined by three or more points. Each polygon has a normal vector defining which side of the polygon faces out of the solid model 120. Because the solid model 120 includes many points and many polygonal surfaces, the solid model 120 appears relatively smooth and the user need not be concerned with the underlying data structure.

The button 91 prompts the CAD system to allow the user to form a new wire (e.g., 121, 521, 522, 523). To select a point on the surface of the solid model 120, the user can place the mouse cursor over the main display, and click the mouse button. This user input defines a location on the surface, as follows. The CAD system uses the location of the mouse click and the current display orientation to project the X and Y location of the cursor on the screen onto the surface of the solid model. The CAD system identifies a surface point corresponding to the mouse click, located on one of the polygons that make up the solid surface. Once the point on the surface of the solid model is selected (e.g., 122a), the CAD system calculates a point in space to be associated with the selected point. In a preferred embodiment, the CAD system places the calculated point along the normal vector of the polygon associated with the point on the surface of the solid model. The point in space is a predetermined distance from the surface of the solid model, specifically the offset data value 61 associated with the point. The selected point (e.g., 122a) is represented on the screen as a line with one end at the selected point, and the second end at the calculated point in space. The outer surface of wire shape 121 touches each of the calculated points in space. Thus, if the offset data value 61 is zero, the wire shape 121 will be tangential to the surface of the solid model 121.

Figure 4:
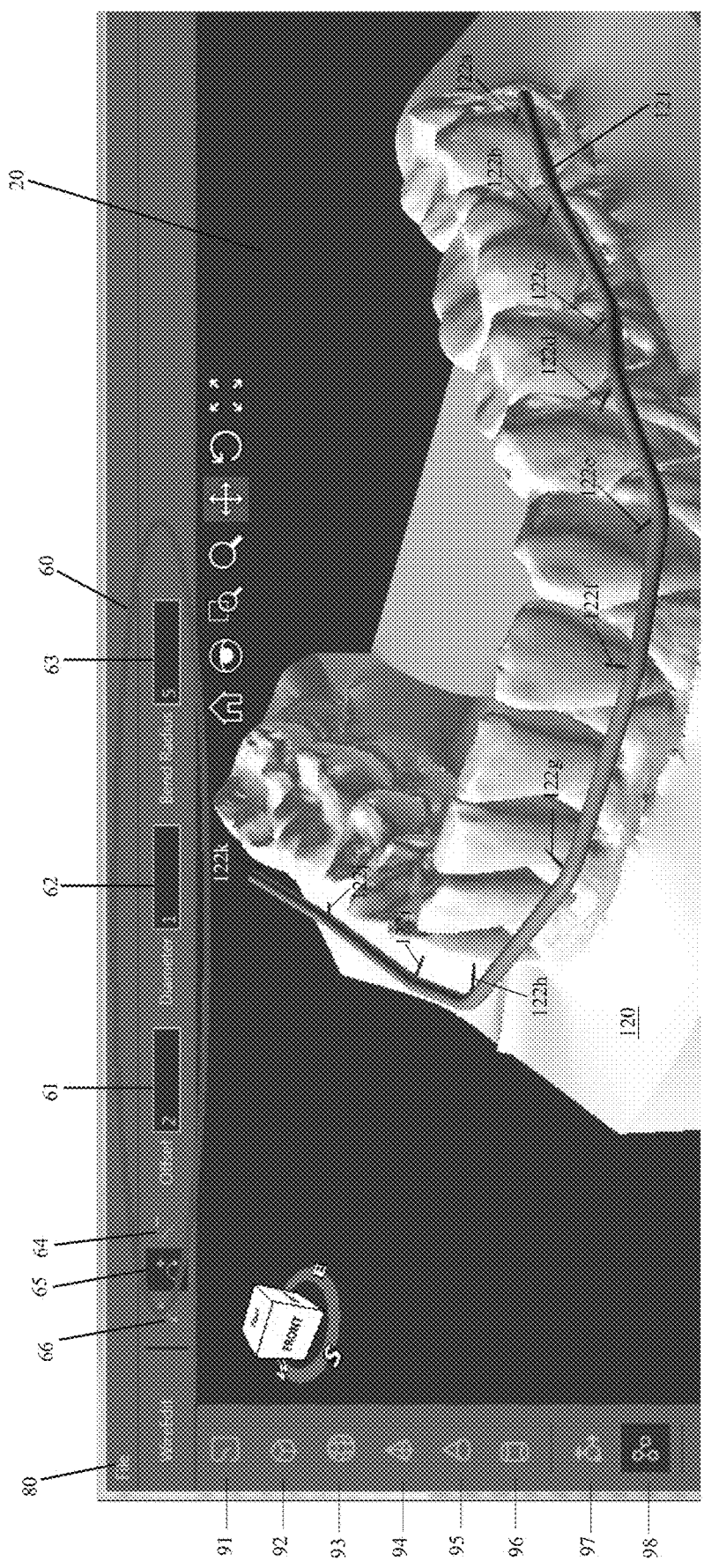
FIG. 4 illustrates a portion of an exemplary screen from the user interface of a CAD system, showing parameters associated with a selected point used to design a wire shape.

FIG. 4 illustrates an enlarged view of a portion of the CAD system user interface 10, showing the main display 20 and the wire editing pane 60. The wire editing pane 60 includes data fields 61-63 to allow the user to edit data associated with each selected point (e.g., 122a-122k). By clicking on a point object (e.g., 140k) in the point object list pane 40, the user can select the corresponding selected point (e.g., 122k) shown in the display windows 20, 22, 24, or 26. The offset data field 61 allows the user to enter a distance value defining how far away from the surface of the solid model 120 to place the wire 121 at the selected point (e.g., 122k). The diameter data field 62 allows the user to enter a value defining the diameter of the wire. The wire diameter is the same for all points on a wire. But the user can draw multiple wires on the same solid model 120 (or different solid models) that have different diameters. Setting the wire diameter changes the visual representation of the wire and wire diameter may also be used for accurate collision checking from wire-to-wire and wire-to-model. When the CAD system creates a part program file, the wire diameter is used to calculate instructions for the wire bending machine. The bend radius data field 63 allows the user to enter a value defining the bend radius associated with the selected point (e.g., 122k).

The rendering of the wire 121 is generated using three-dimensional primitive shapes. These shapes are rendered in part using functionality available through an OpenGL toolkit, as described above. For example, a wire having a circular cross-section is represented by straight segments comprising a cylinder and bend segments comprising arc segments of a torus. A wire haring a rectangular cross-section is represented by straight segments comprising a rectangular parallelepiped and bend segments comprising arc segments of a rectangular toroid.

Data to define the wire is stored in memory by the CAD system. In a preferred embodiment, the CAD system software stores the wire as an ordered series of data objects. Each data object defines a straight wire segment or a bent wire segment.

The CAD system user interface 10 includes buttons that allow the user to add selected points to the wire 121 and to remove selected points. The button 64 allows the user to click and delete a selected point by clicking on the selected point with the mouse cursor. The button 65 does allows the user to add a point to the wire at the end of the wire 121 so that the wire 121 will extend to the new point. When the user selects a new point on the surface of the solid model 120, the CAD system will extend the wire 121 from the newly selected point to the most recently/previously selected point. The button 66 allows the user to add a point to the wire in the middle of the wire 121. When the user selects a point on the surface of the solid model 120 the CAD system will automatically identify the closest existing points in the wire 121 and automatically removes the segment between the two existing selected points. The CAD system automatically connects the wire 121 through the newly selected point "between" the two existing selected points. In one mode of operating, the user may also add a point along the existing wire 121 by clicking on the wire itself. In this mode, the CAD system will identify a point on the surface of the solid model 120 closest to the wire and add a point to the wire at that point. Adding a point in this manner automatically places the wire at a predetermined distance from the surface of the solid model 120 according to the offset value (e.g., the value in field 61).

In certain modes of operation, the CAD system will automatically add a point along the existing wire 121 to resolve a collision between the wire 121 and the solid model 120. In this mode, the CAD system will identify a point where the wire 121 intersects with the surface of the solid model 120. The CAD system will add a selected point at the location of the intersection, calculate the normal vector associated with the surface at the selected point, and place the wire at the offset distance along the normal vector such that the wire is reshaped to avoid the surface of the solid model 120. Automatically adding a point in this manner automatically places the wire at a predetermined distance from the surface of the solid model 120 according to the offset value (e.g., the value in field 61).

As illustrated in FIG. 4, the wire 121 forms an open shape, with points 122a and 122k at either end. The following describes the process of generating the wire shape 121. The first point selected by the user (e.g., 122a) will become one end of the wire. When the user selects a second point (e.g., 122b), the CAD system will draw a straight wire segment between the first point 122a and the second point 122b. When the user selects a third point (e.g., 122c), the CAD system will update the wire 121. If the three selected points 122a, 122b, and 122c are collinear, then the wire 121 will comprise a straight segment spanning from the first selected point 122a to the third selected point 122c. If, however, the three selected points 122a, 122b, and 122c are not collinear, the CAD system will calculate the angle between a first wire segment connecting 122a to 122b and a second wire segment connecting 122b to 122c. To generate the wire 121 connecting these two segments, the CAD system generates a bend segment having a bend radius corresponding to the bend radius data field 63, having a bend angle corresponding to the angle between the two segments (122*a*-122*b* and 122*b*-122*c*). The bend segment is oriented such that the middle of the bend segment passes through the calculated point in space corresponding to the second selected point 122*b*.

Each additional selected point extends the wire 121. As illustrated in FIG. 4, the first selected point 122*a* and the last selected point 122*k*, respectively, define end points for two straight wire segments. Each intermediate selected point 122*b*-122*j* defines the mid-point of a bend segment that connects adjoining straight segments.

Figure 5:
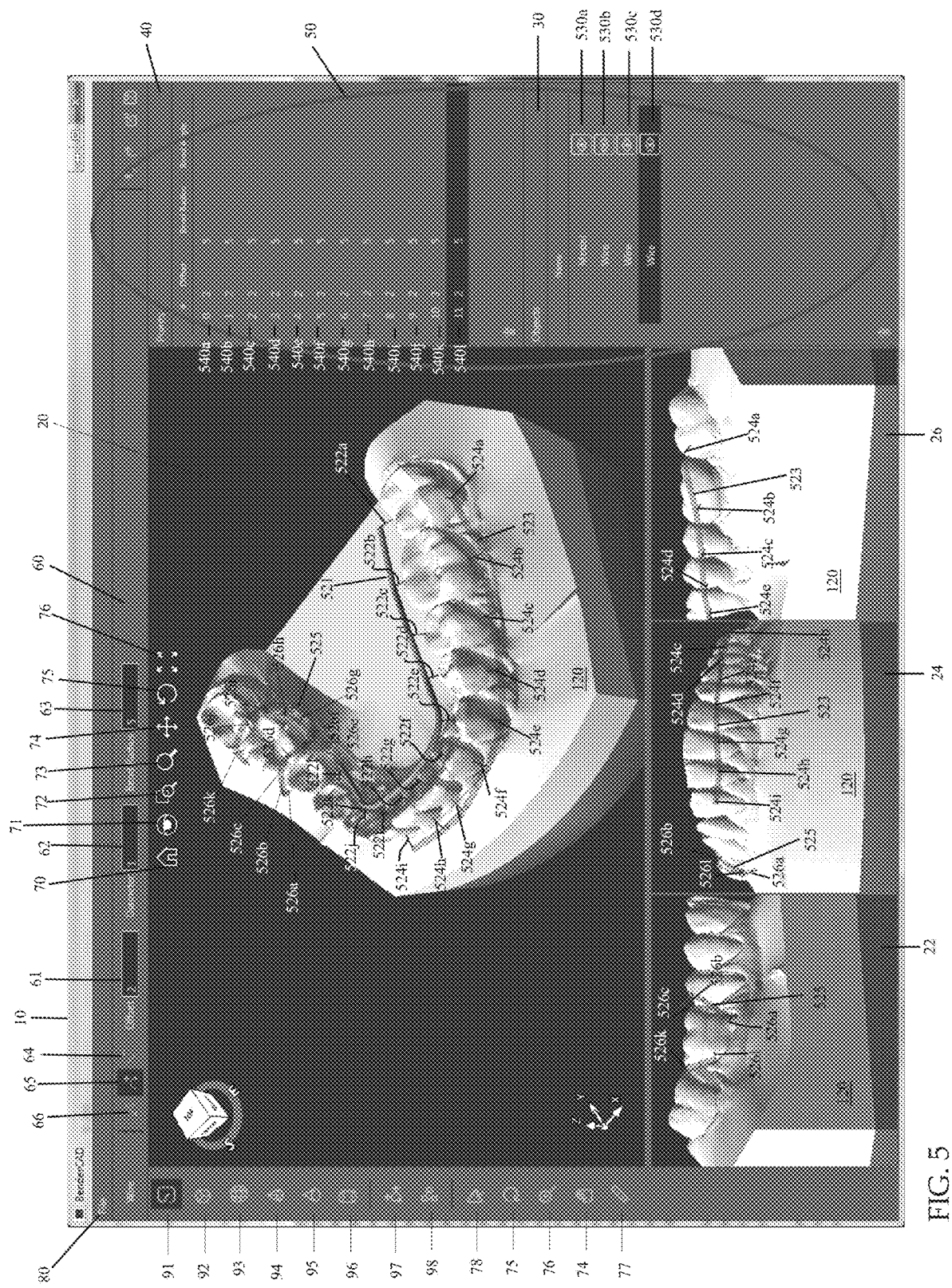
FIG. 5 illustrates an exemplary screen from the user interface of a CAD system, showing a solid model and several wire segments designed to fit the solid model.

FIG. 5 illustrates the CAD system user interface 10 in a state with three separate wires 521, 523, and 525 drawn on the solid model 120. The wire 521 is selected, as indicated by the solid coloring of that wire in the display pane 20. The object list pane 30 lists four objects, including the solid model object 530*a*, and three wire objects 530*b*-530*d*. The selected wire object 530*d* corresponds to the solid colored wire 521 illustrated in the main display pane 20. The points list pane 40 lists each of the points 540*a*-540*l* associated with the selected wire 521.

Figure 9:
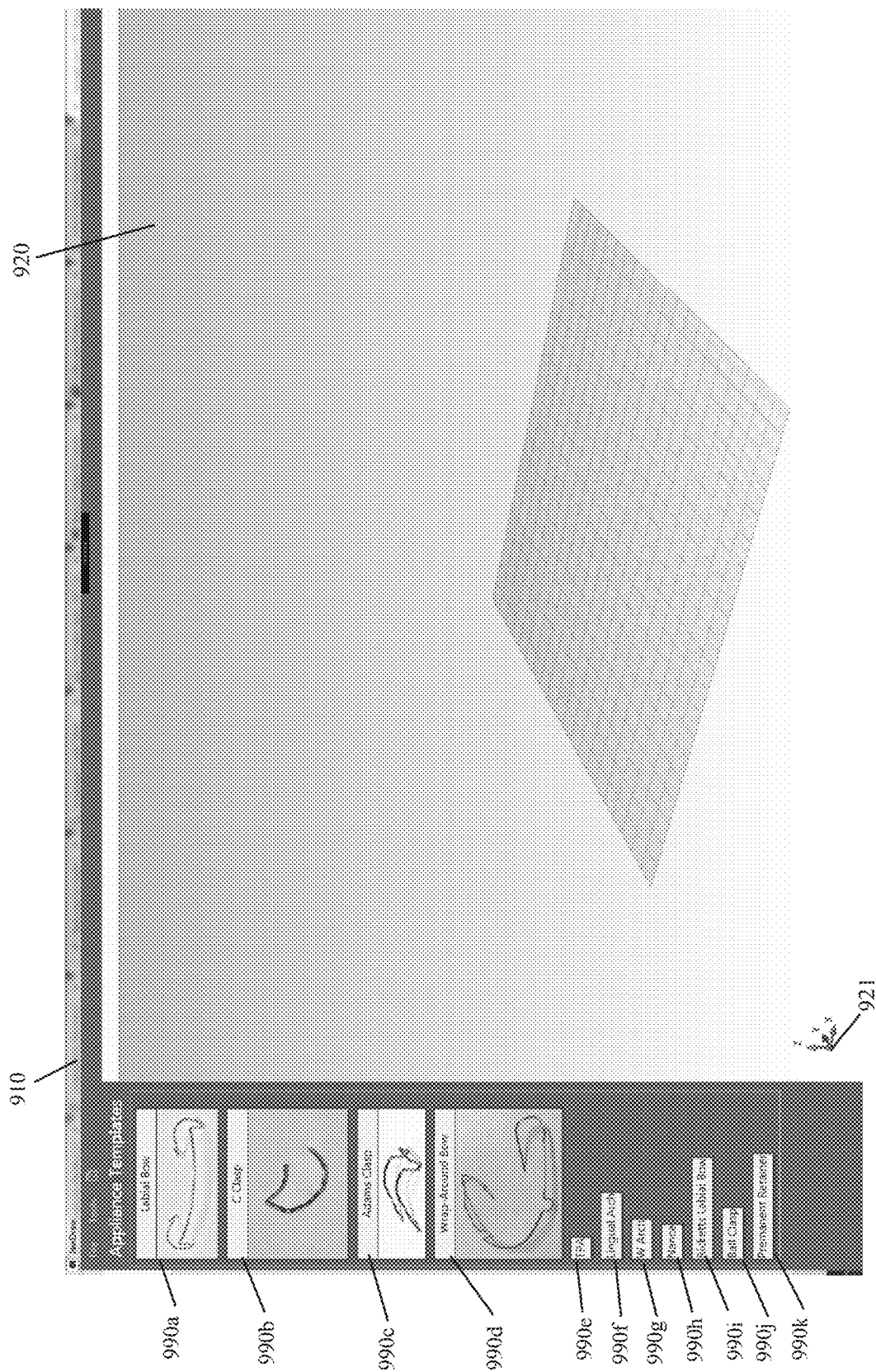
FIG. 9 illustrates an exemplary screen from the user interface of a CAD system, showing a templates that the user may select to define a wire.

FIGS. 9-14 illustrate another example user interface for the CAD system in which a wire template is used to define a wire. A template is a predefined wire having a series of segments that define straight segments, bends, and arcs. Each of the segments includes default lengths, bend radii, or arc diameters. To fit the template wire to a given solid model, the CAD system adjusts the default lengths, bend radii, or arc diameters to fit the template wire onto user-selected points on a solid model. The template defines the what parameters should be adjusted so that the general shape of the template wire is preserved even though certain dimensions are adjusted to fit the template onto the solid model. FIG. 9 illustrates a CAD system user interface 910 used to build a wire based on a template. A viewing window 920 displays a solid model of the same type discussed above with respect to FIGS. 1-5. The orientation of the solid model is illustrated by axes 921 illustrated within the viewing window 920. A list of wire templates 990*a*-990*k* are provided such that the user may select the template. In the illustrated example, the user interface 910 provides images of the templates so the user can select the template based on an image of the template wire. In some examples, the list of templates may be provided in a drop-down window or a separate dialog box called up by the user to select a template wire. In the context of orthodontics, for example, the templates are various known wires used in orthodontic appliances. These may include, for example, a labial bow 990*a*, c-clasp 990*b*, Adams clasp 990*c*, wrap-around bow 990*d*, TPA 990*e*, lingual arch 990*f*, W-arch 990*g*, nance 990*h*, Ricketts labial bow 990*i*, ball clasp 990*j*, or permanent retainer 990*k*.

When the user selects a template, the user is prompted to define certain predetermined features of the template. These parameters generally include wire diameter and wire point offset. When prompted by the CAD system, the user will select points that will define how the template wire should be fit to the solid model. Certain points selected by the user use the wire point offset to define how far the wire should be from the surface of the solid model. Additional parameters may be necessary. In the orthodontic context, for example, a given template wire will require the user to identify any teeth missing in the patient's jaw. The user may also be prompted to provide information specific to the template wire, e.g., loop diameter, select whether to include a retention loop on the ends of the wire, or provide a retention loop diameter.

Figure 10:
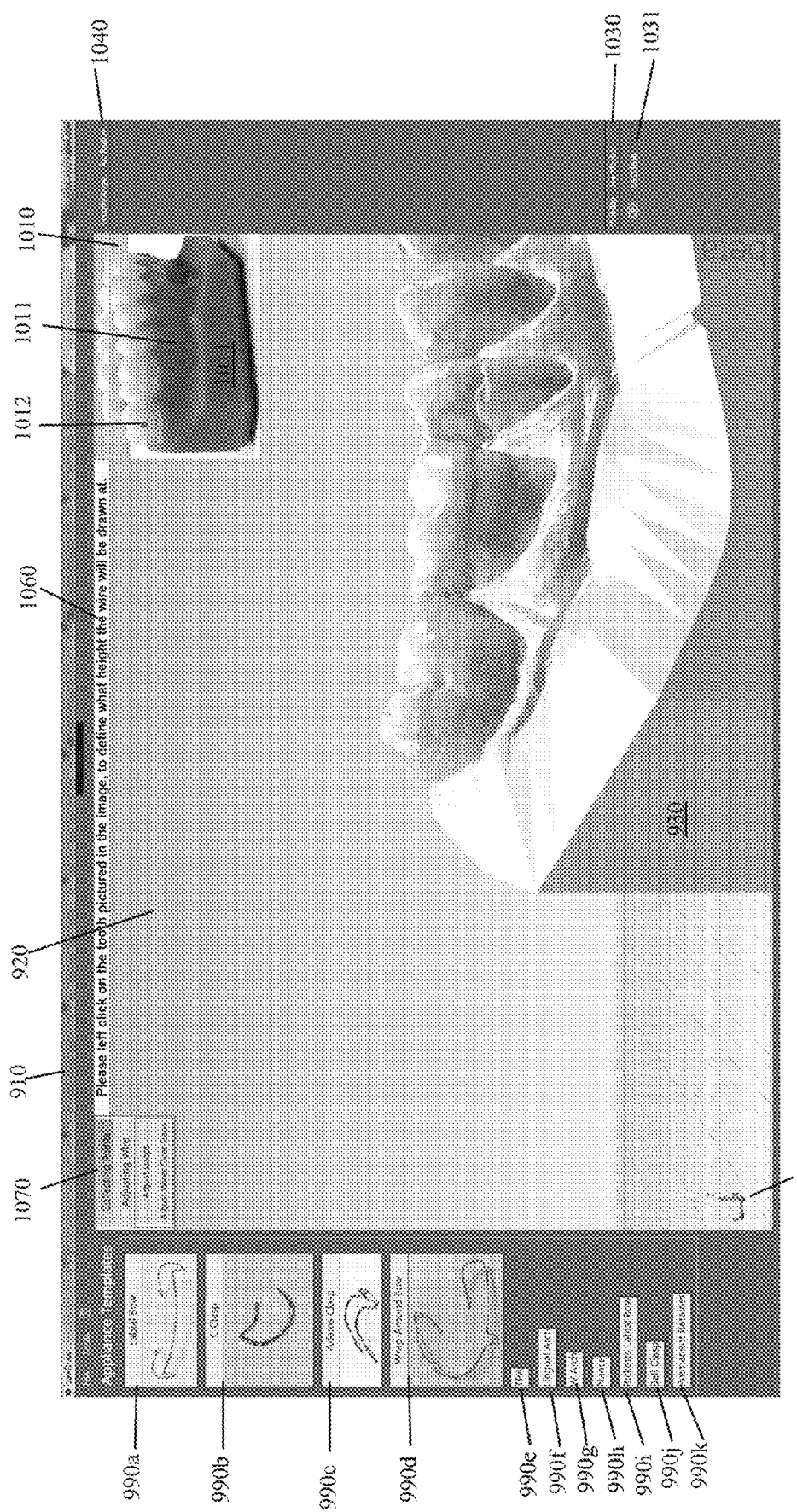
FIG. 10 illustrates an exemplary screen from the user interface of a CAD system, showing a view in which the user is prompted to select a point that will define the position of a feature of a template wire.

FIG. 10 illustrates the CAD system user interface 910 after a solid model 930 has been imported into the CAD system. As shown, the CAD system user interface 910 includes an object list pane 1030. After the solid model 930 is imported, a list item 1031 is added to the object list pane 1030 corresponding to the solid model 930. The user can select the solid model 930 by clicking on the list item 1031. The CAD system user interface 910 also includes a wire segment list pane 1040, which will be empty until a wire has been defined by the CAD system.

When using templates to define the wire, the solid model 930 must be oriented relative to the axes 921. This makes it possible to orient the solid model 930 within the CAD system in a known way. Once the solid model 930 is oriented, the CAD system is capable of placing a template wire in the same orientation so that it aligns with the solid model 930. Further, the viewing window 920 can render the solid model 930 at predefined orientations so that a user can select points on the surface of the solid model. Techniques for shifting the viewing angle of the solid model 930 are known within the art, which includes known software tools used to render three-dimensional graphics such as OpenGL. Similar to the illustration described above with respect to FIG. 3, the user will select points on the solid model used to build the wire.

Returning to FIG. 10, the points are used to orient the selected template relative to the solid model. In one example a series of user prompts are used to act as a "wizard" that will walk the user through the steps needed to fit the template wire to the solid model. A window 1070 illustrates the steps within the wizard, and identifies the current step to orient users as they complete the steps within the wizard. In FIG. 10, the CAD system user interface includes instructions 1060 that prompt the user to select a certain point on the solid model 930. For example, the CAD system may prompt the user to "Please left click on the tooth pictured in the image, to define what height the wire will be drawn at." To further aid the user, a window 1010 displays an image of a prototypical model 1011, with a point 1012 identified as the prototypical location that the user should identify and select on the solid model 930.

Figure 11:
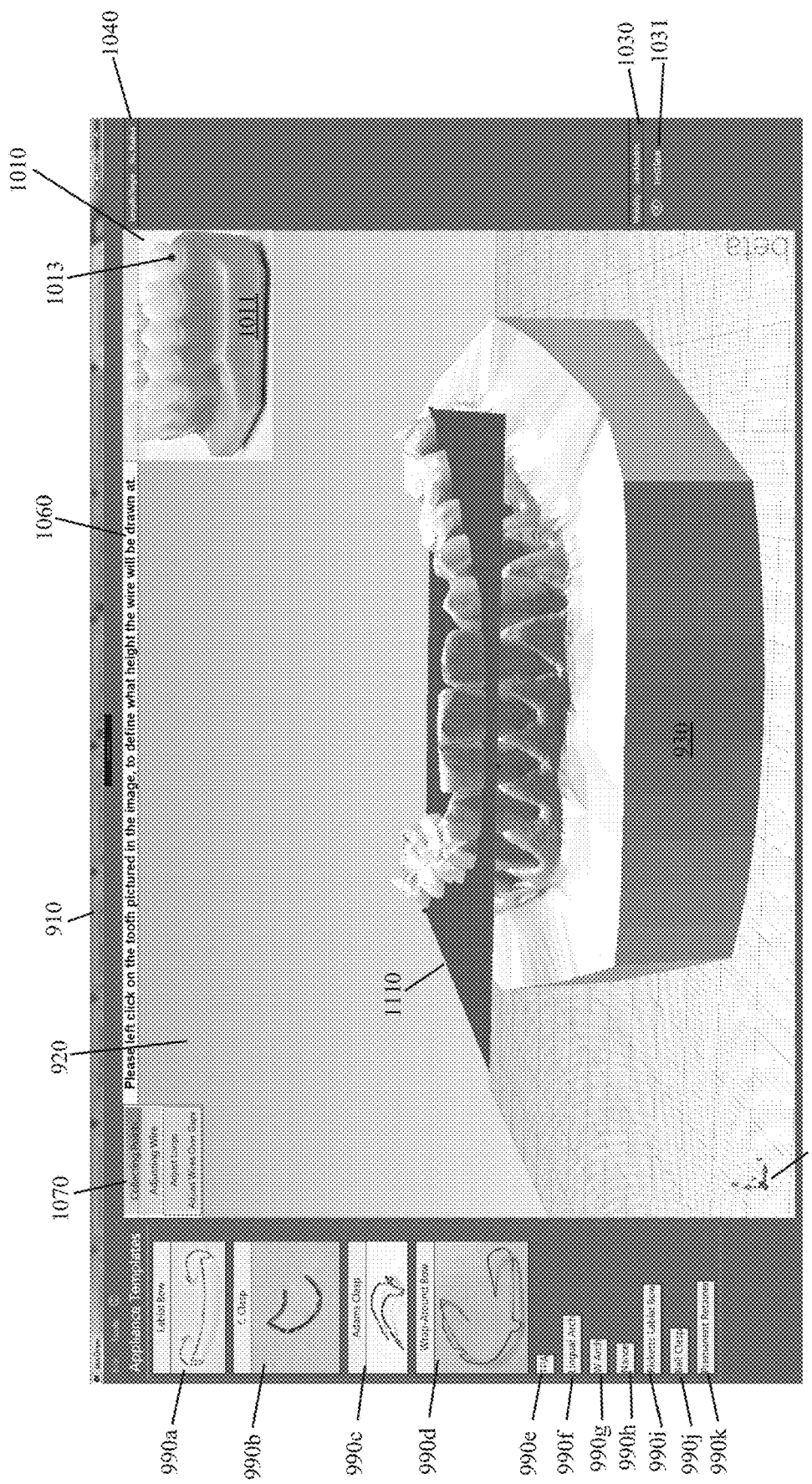
FIG. 11 illustrates an exemplary screen from the user interface of a CAD system, showing a view in which the user is prompted to edit a plane that will define the position of a feature of a template wire.

FIG. 11 illustrates the CAD system user interface 910 at an optional step that may be used to confirm a plane 1110 along which the template wire will be placed. The plane 1110 is calculated, for example, by using three separate points defined by the user. In other examples, the plane 1110 may be defined by calculating a best fit or other filter that calculates the location of the plane from more than three points. In the view presented in FIG. 11, the user may adjust the location of the plane 1110 by clicking and dragging the plane to change its angle or offset relative to the solid model 930. Calculating a plane for the template wire has particular utility in the context of orthodontic wires in which the wire must be fit around the front teeth of the patient's jaw. For example, labial bows, wrap-around bows, and other wires incorporate a large diameter arc that must be fit to the surfaces of the patient's front teeth. The plane 1110 serves to define the plane of the large diameter arc, and arc itself is curve-fit to the intersection of the plane 1110 and the solid model 930.

Figure 12:
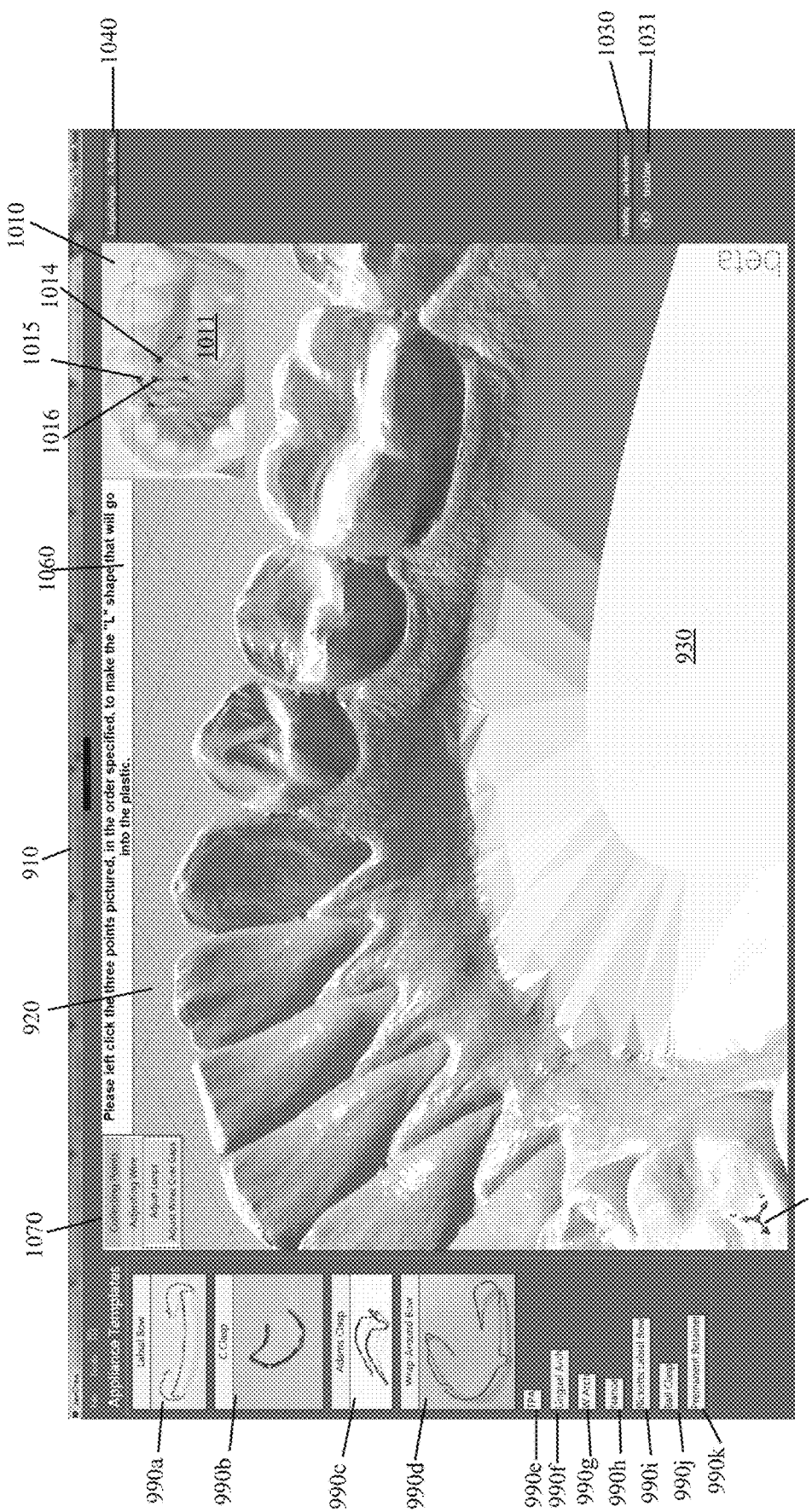
FIG. 12 illustrates an exemplary screen from the user interface of a CAD system, showing a view in which the user is prompted to select three points that will define the position and shape of a feature of a template wire.

FIG. 12 illustrates the CAD system user interface 910 at an optional step in which multiple points are used to build a complex wire structure. The window 1010 displays an image of a prototypical model 1011, with three separate points 1014, 1015, and 1016 identified as the prototypical locations that the user should identify and select on the solid model 930. The window 1010 identifies the sequence in which the user must select the three points 1014, 1015, and 1016. In this example, the three points will be used to define the wire segments associated with an "L" shape needed in the template wire i.e., the end points of each leg of the "L" and a mid-point that defines the apex of a bend segment. The instructions 1060 prompt the user to select the multiple points on the solid model 930. For example, the CAD system may prompt the user to "Please left click the three points pictured, to make the 'L' shape that will go into the plastic."

Figure 13:
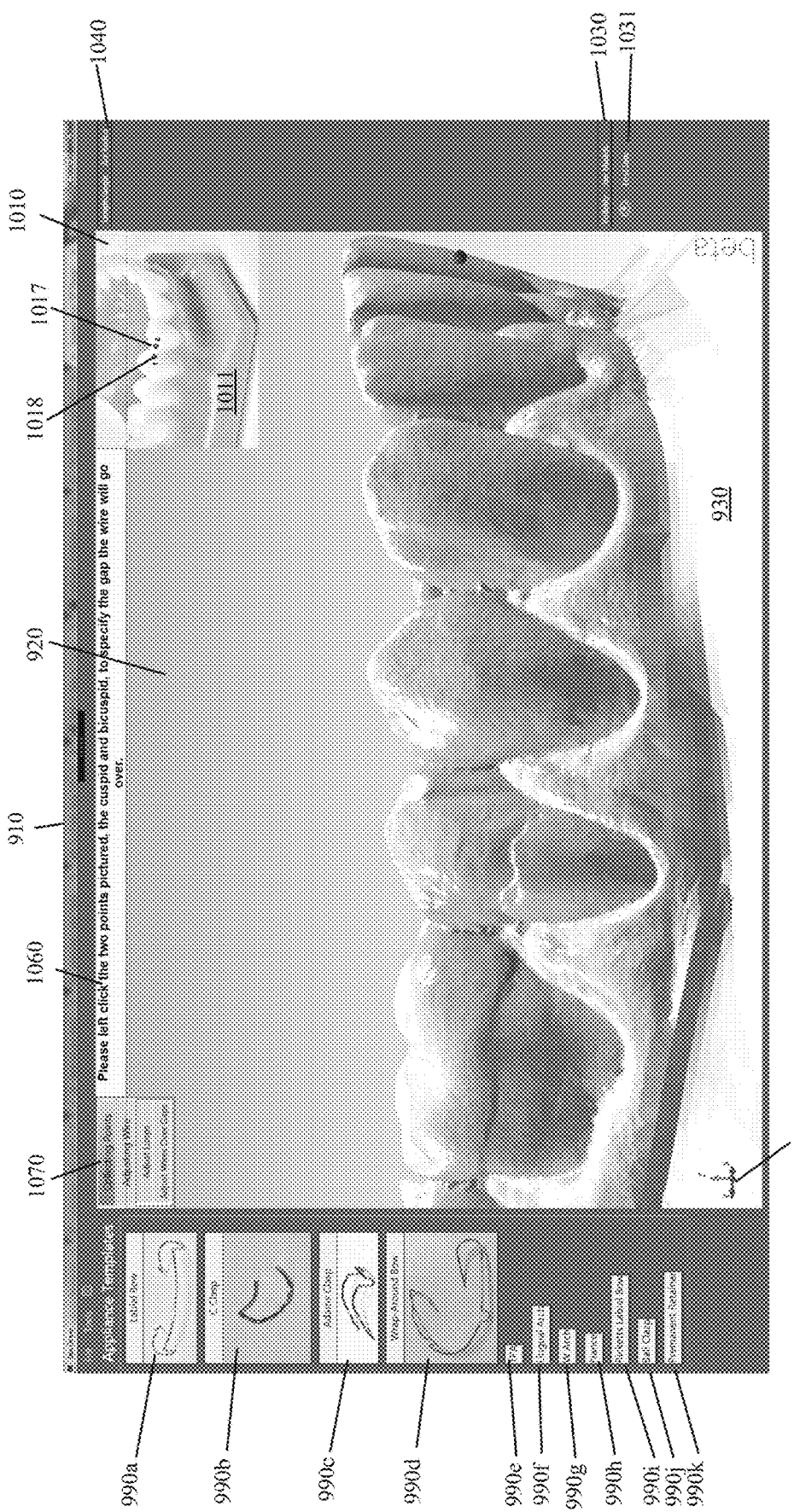
FIG. 13 illustrates an exemplary screen from the user interface of a CAD system, showing a view in which the user is prompted to select multiple points that will be used to calculate the position of a feature of a template wire.

FIG. 13 illustrates the CAD system user interface 910 at an optional step in which two points are used to calculate a single point where the wire needs to pass. The window 1010 displays an image of a prototypical model 1011, with two separate points 1017 and 1018 identified as prototypical locations that the user should identify and select on the solid model 930. In this example, the two points are used along with the solid model so that the CAD system can identify a gap between the cuspid and the bicuspid teeth on the patient's jaw. The CAD system uses the selected points to identify the gap between the two teeth. The instructions 1060 prompt the user to select the desired points on the solid model 930. For example, the CAD system may prompt the user to "Please left click the two points pictured, the cuspid and bicuspid, to specify the gap the wire will go over."

Figure 14:
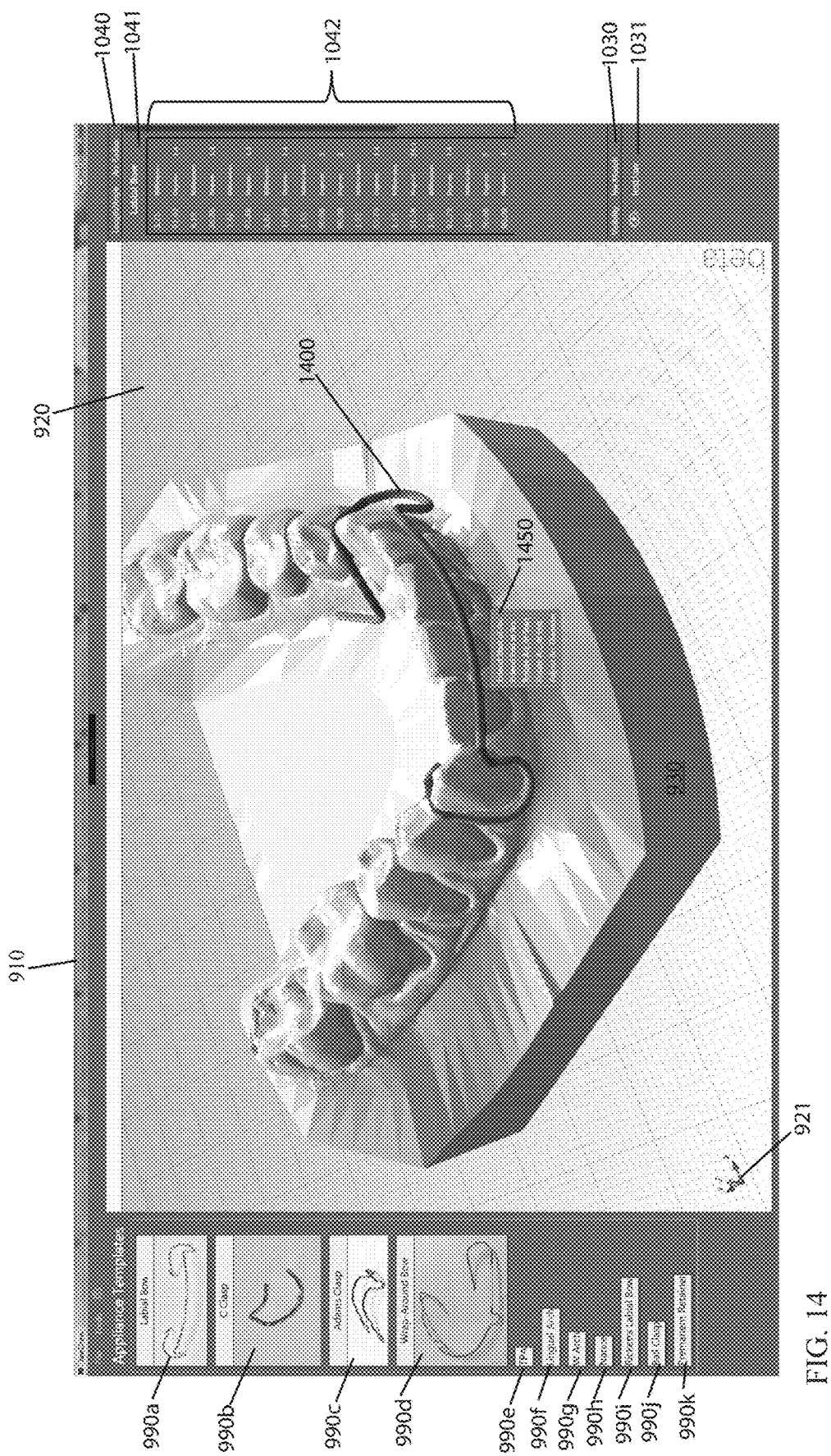
FIG. 14 illustrates an exemplary screen from the user interface of a CAD system, showing a view in which the user may edit segments in a wire formed from a template.

FIG. 14 illustrates the CAD system user interface 910 after a wire 1400 has been generated from a template and fit to the solid model 930. The wire 1400 is comprised of multiple segments. The wire segment list pane 1040 displays a list of wire segments 1042, with parameters associated with each segment. Straight segments, for example, include a length parameter. Bend segments include a bend angle parameter and an arc radius parameter. In the illustrated example, the wire 1400 is a labial bow. The arc radius may be defined by tooling available on the bending machine. Bending machines typically include one or more bending pins against which the wire may be bent. Relatively larger bend radii may be formed by feeding the wire against a tooling pin. The tooling pin continuously bends the wire while the wire is fed.

Each wire segment can be edited by clicking on the wire to access a segment editing menu 1450. The menu 1450 includes options by which the user may edit the segment or the adjacent segments. Different segments of the wire template have predefined editing options. For example, the large arc at the front of the labial bow illustrated in FIG. 14 can be edited to extend the start of the art or extend the end of the arc. These editing options change the length of the large arc at the respective ends of the arc. The large arc can also be edited by rotating the arc at the start or rotating the arc at the end. These editing options change the angular orientation of semi-circular features at either end of the large arc. Lastly, the user may adjust the arc diameter to change how the large arc interacts with the front of the patient's jaw.

In general, straight wire segments allow the user to change the length of the segment and bend segments allow the user to change the bend angle of the segment. Other adjustments may be defined for each wire segment. The template defines what editing options are available for each segment within the wire shape.

The user may be allowed to add a new point along a segment, by selecting a menu option from the segment editing menu associated with that segment. The CAD system will prompt the user to select a point on the surface of the solid model 930. Once the user has selected the point, the CAD system will add one or more straight segment and bend segment to fit the wire through a calculated point at a predetermined distance from the surface of the solid model 930 at the selected point.

The CAD system includes automated collision detection, and identifies wire segments that collide with the surface of the solid model 930. The colliding segments may be identified by color coding by listing segments that require further user edits, or by guiding the user through a series of editing steps by successively rotating the view to zoom in on each colliding segment.

The user can command the CAD system to export a wire part program file any time after the wire has been created. In some examples, the CAD system includes automated algorithms designed to improve the manufacturability of the wire by optimizing the wire part program file to prevent collisions between the wire and the wire bending machine during manufacture of the wire. In wires generated from a template, the template may define manufacturing optimizations specific to the geometry of the template wire.

Figure 6:
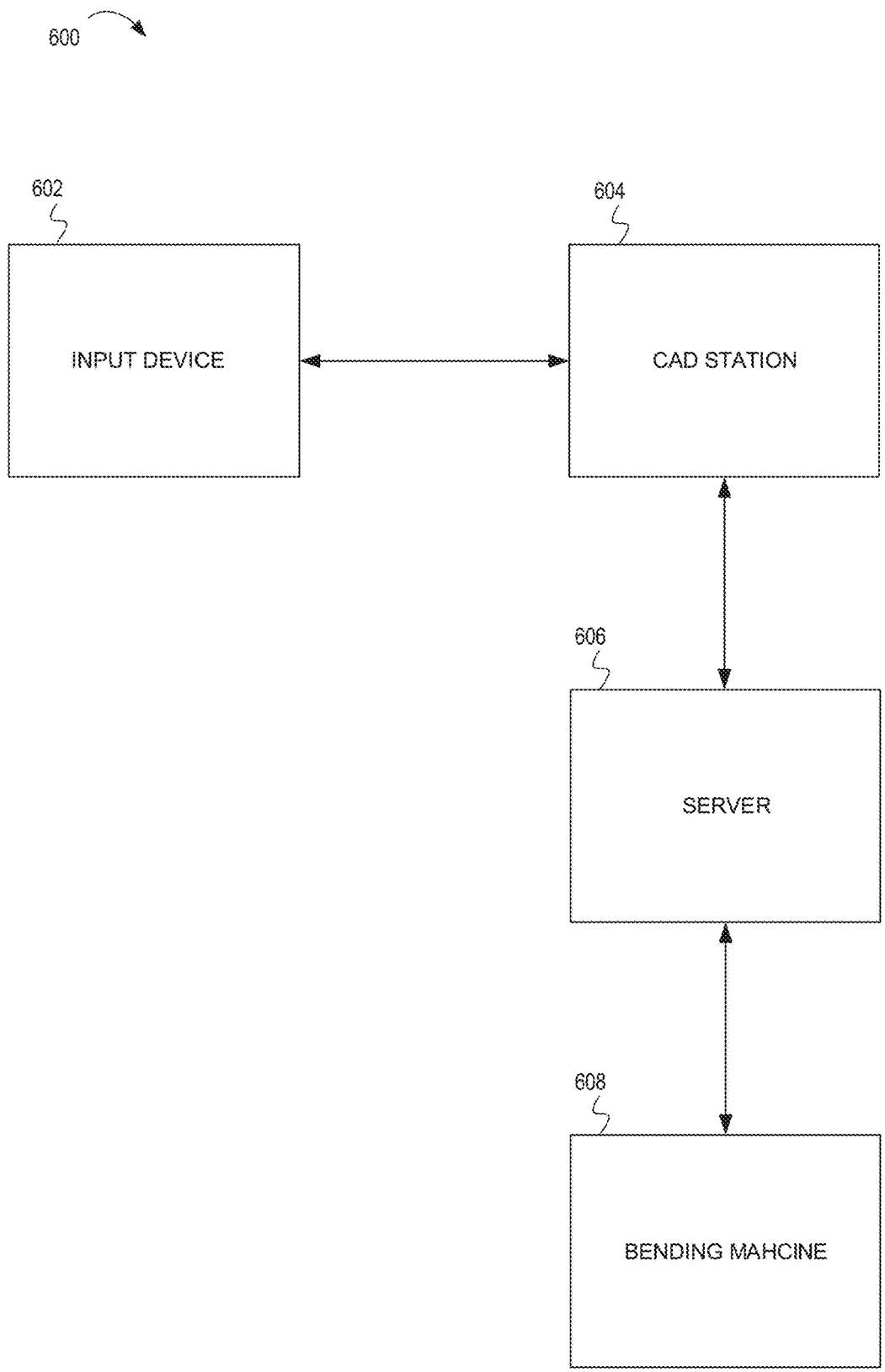
FIG. 6 is a block diagram of a system 600 for automatically manufacturing a wire shape, according to some embodiments of the inventive subject matter.

FIG. 6 is a block diagram of wire bending system 600, according to some embodiments of the inventive subject matter. The system 600 includes an input device 602, a computer-aided design ("CAD") station 604, a server 606, and a wire bending machine 608. In some embodiments, the input device 602, CAD station 604, server 606, and bending machine 608 are local to one another. In such embodiments, the bending machine 608 can be small enough such that the system 600 can be located in an office environment. In a preferred embodiment, the system 600 is located within an orthodontic practitioner's office and is used to fabricate orthodontic wires, by placing the wire bending machine 608 within the orthodontist's control and providing tools for easily generating a wire shape. Such a configuration may decrease both the time and the cost of manufacturing orthodontic arch wires.

In other embodiments, the wire bending machine 608 is large and designed for industrial manufacturing. In this example, the CAD station 604, the server 606, and the wire bending machine 608 may be located together. The input device 602, however, is likely to be remote from the other components of the system 600.

Regardless of the type of wire bending machine 608, one or more components of the system 602 may be remote from others of the components. Systems depicted in FIG. 6 can be used to manufacture any type, size, or shape of wire so long as the wire bending machine 608 is capable of handling the wire diameter. For example, the input device 602 and the CAD station 604 can be located in an office and the bending machine 608 can be located at a remote facility.

The input device 602 receives and/or generates data associated with a patient's mouth. For example, the input device 602 can determine locations of the patient's teeth and/or desired locations for orthodontic appliances (e.g., brackets). Accordingly, the input device 602 can take any suitable form. In one embodiment, the input device 602 is part of the CAD station 604, or is another CAD station, at which a solid model is created to represent a pre-existing object. In a preferred embodiment, however, the input device 602 is a computer including devices required to capture an image of a patient's mouth, such as an oral imaging device. The computer presents a three-dimensional solid model of the patient's jaw and teeth. The model of the patient's mouth may be captured directly by scanning the patient's jaw and teeth with an oral imaging device or indirectly by scanning a physical model or casting of the patient's mouth. As discussed above, the model may be manipulated to reflect desired positions and orientations of each individual tooth within the patient's mouth.

The CAD station 604 receives a solid model from the input device 602, and the user selects points on the surface of the solid model from which the CAD system 604 determines the wire shape. The CAD system 604 generates a wire part program file that the bending machine 608 can use to manufacture the arch wire. In some examples, the wire part program file is encrypted.

The server 606 transmits the part program file to the bending machine 608, and optionally stores the wire part program file. In local embodiments, the server 606 can be an interface or bus between the CAD system 604 and the bending machine 608. In remote embodiments, the server 606 can be an intermediary node within a communications network.

The bending machine 608 receives the wire part program file and manufactures the arch wire based on the wire part program file. The bending machine 608 can take the form of the wire bending machine described herein or any other suitable wire bending machine.

Figure 7:
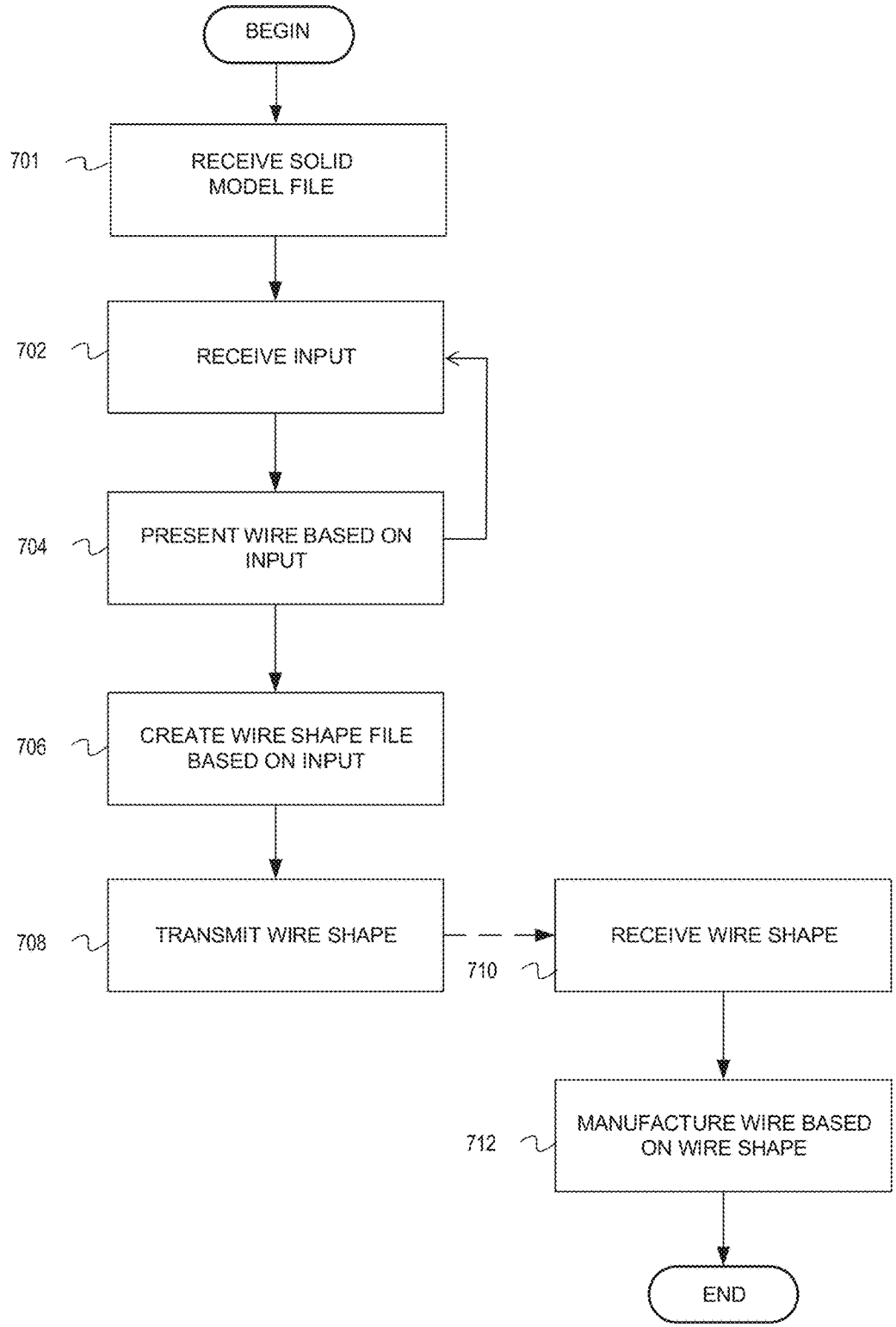
FIG. 7 is a flow chart depicting example operations for automatically manufacturing a wire, according to some embodiments of the inventive subject matter.

FIG. 7 is a flow chart depicting example operations for manufacturing wires using the wire manufacturing system 600 depicted in FIG. 6. In some examples, the operations of blocks 701-708 are performed by a first device, such as a CAD station 604 and the operations of blocks 710-712 are performed by a bending machine 608.

The flow begins at block 701, where the solid model file is received. Typically, the user opens the CAD system software, as described above, and is presented with the CAD system user interface 10 as illustrated in FIGS. 1-5 or 910 as illustrated in FIGS. 9-14 and discussed above. For example, by selecting the file menu 80 and choosing to "Import CAD" 82, the user is prompted to select a solid model file, preferably in .STL, .STP, or .IGES formats. In response to the user's selection, the CAD system software imports the solid model file into the CAD system. In some embodiments, the input is a scan or other representation of an orthodontic patient's mouth, generated by an oral imaging device or other tool as discussed above with respect to the input device 602. Alternatively, the CAD system user interface 10 may be used to generate a solid shape from pre-defined primitives. For example, the user may create solid object models from basic shapes such as cubes, cones, pyramids, cylinders, and spheres. These solid object models, once created, can be used to select points that will define the wire shape.

In step 702, a representation of the solid model file is displayed on the CAD system user interface (10 or 910) and the user selects points on the surface of the solid model, as described above with respect to FIGS. 1-5 and FIGS. 9-14, to define the wire path. In a preferred embodiment, the points selected by the user correspond to locations where the user intends to place orthodontic appliances on the patient's teeth. In some embodiments, the user selects a template wire and loads a file associated with that wire into the CAD system user interface 10. The user can then select locations on the surface of the solid model to customize the template wire. In a preferred embodiment, for example, known archwire shapes may be used as a starting template and customized to fit the shape of the patient's mouth by selecting points on the surface of the patient's teeth that correspond to predefined template features.

The CAD system determines a wire shape based on user selected points, as discussed above with respect to FIGS. 1-5 and 9-14. At block 704, a representation of the wire is generated and the CAD system 604 presents a representation of the wire shape in the CAD system user interface 10. The wire shape is calculated from the selected points, including parameters that may be defined by the user such as the diameter of the wire and the distance from the outside of the wire to the surface of the solid model. In some embodiments, the CAD system 604 presents the wire in real time as the user selects the locations (i.e., the CAD systems presents the arch wire as the input is received).

As illustrated in FIG. 5, the user may draw multiple wires concurrently. As discussed above, the button 91 prompts the CAD system to allow the user to form a new wire (e.g., 121, 521, 522, 523). The user can select and edit points for each additional wire in the same ways described above. In examples using template wire shapes, the CAD system also allows the user to define multiple wires from different templates.

As discussed above, the user can manipulate the representation of the wire shape by selecting a point (e.g., 140a-140k in the point list pane 40) and then changing the offset data value 61, diameter data value 62, or bend radius value 63 for the selected point. The user may also move the location of the selected point to adjust the shape of the wire, for example by clicking on the selected point as displayed in the main display pane 20 and dragging the selected point to a new location on the surface of the solid model 120. Likewise, for wires generated from a template, the user can edit segment parameters as discussed above with respect to FIG. 14.

The CAD system user interface (10 or 910) allows the user to visualize the wire shape in relation to the pre-existing solid model. Because the wire shape is drawn in place, it appears in the correct orientation relative to the solid model. This simplifies the visualization process. The user may manipulate the view of both objects to study the spatial relationship between the wire shape and the solid model. In one example, the CAD system provides automated collision detection and provides an indication to the user of any collisions between the wire shape and the solid model, for example, by changing the color of a wire segment that collides with the solid model. In another example, the CAD system allows the user to measure the distance between a selected feature and the solid model.

At block 706, a wire part program file is created. The part program comprises steps defining the length and bend angle for each wire segment. In part programs designed for more sophisticated wire bending machines, the steps may further define rotation and bend radius for each wire segment. In one example, the part program is general and the steps define the wire segments. In this example, the part program file will need to be converted to suit the specific wire bending machine 608. In other examples, the part program is a proprietary format providing movement steps to be executed by the servo controller on the wire bending machine 608. In this example, the part program file does not need to be converted and can be run as-is by the wire bending machine 608. In either case, the wire part program file may be encrypted.

At block 708, the wire part program file is transmitted. For example, the CAD system can transmit the wire part program via any suitable communications network including Ethernet or serial protocols including RS-232 or USB. The CAD system may also use the Internet to route the wire part program over public data networks and servers. In other examples, the wire part program is transferred on physical media such as a flash storage device or a portable hard drive, including recordable media such as a CD or floppy disk.

At block 710, the wire part program is received at a wire bending machine, for example at a user interface that controls the wire bending machine. If the wire part program file is encrypted, the wire bending machine decrypts the file. In some examples, the wire part program is converted to suit the specific wire bending machine that will fabricate the wire part. Lastly, at block 712, a wire based on the wire part program is manufactured according to the instructions in the wire part program. The bending machine manufactures the wire by feeding, bending, rotating, and/or cutting a straight wire based on the wire part program file.

Figure 8A:
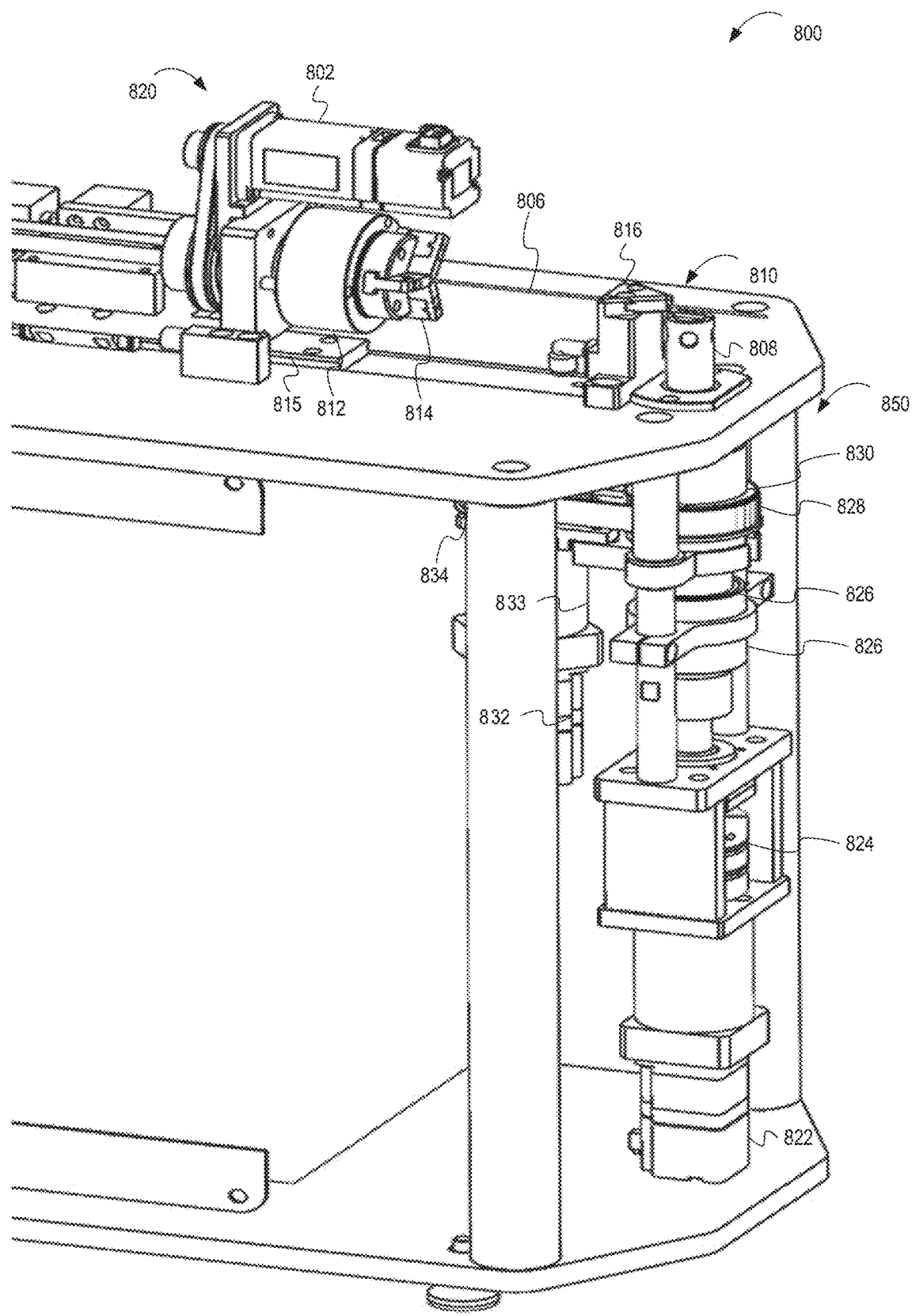
FIGS. 8A and 8B illustrate isometric and sectional views of an exemplary bending machine 800.
Figure 8B:
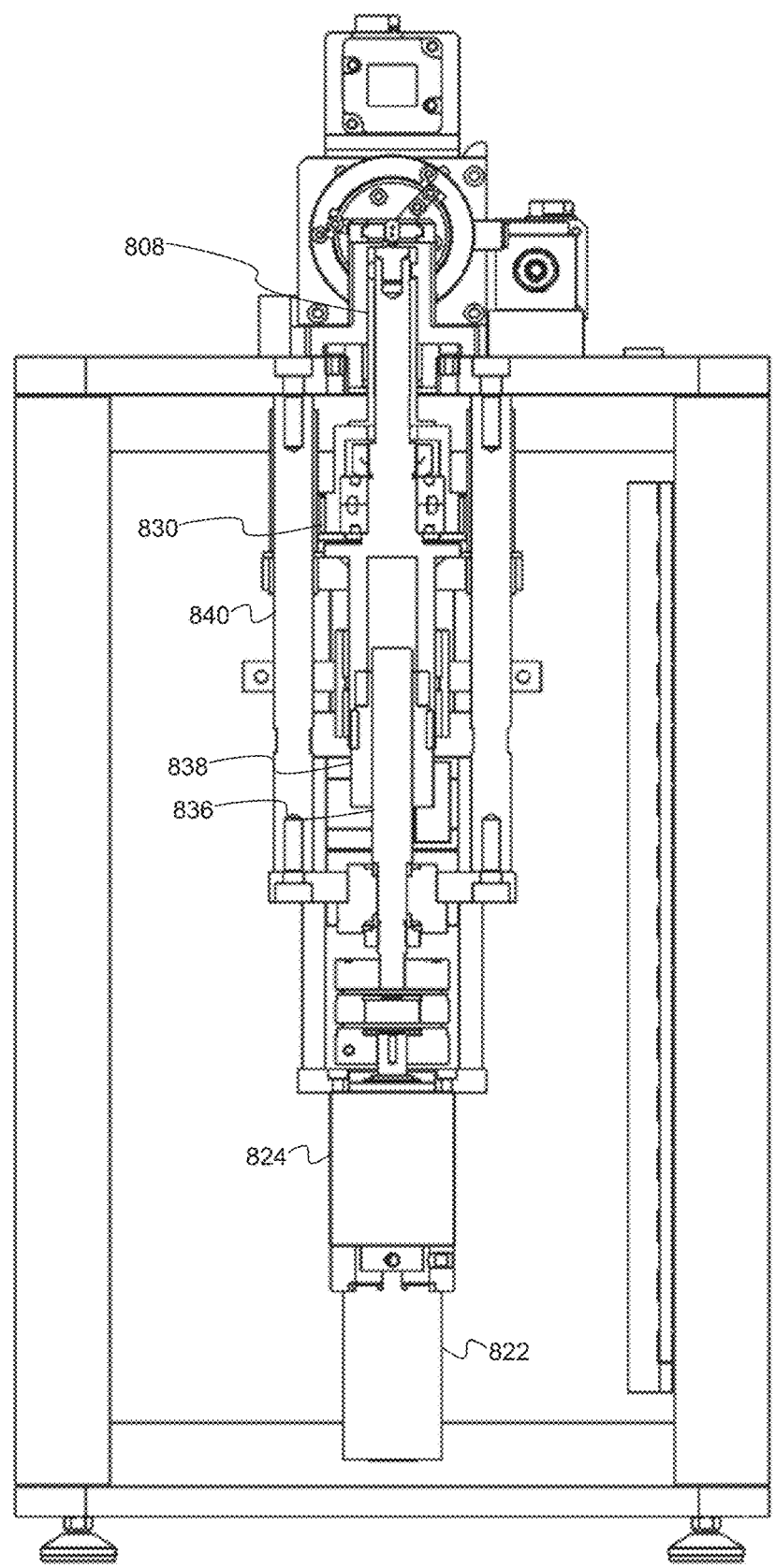

FIGS. 8A and 8B provide a broad overview of an example wire bending machine, according to some examples of the inventive subject matter. FIG. 8A is an isometric view of a bending machine 800, according to some embodiments of the inventive subject matter. The wire bending machine 800 includes a wire feeding and clamping mechanism 820, a wire guide 816, and a bending head 810. The clamping mechanism 820 secures a wire 806 while the bending head 810 bends the wire 806. The clamping mechanism 820 secures the wire 806 via jaws 814. The example bending machine 800 depicted in FIGS. 8A and 8B includes three jaws 814, although other configurations are possible (e.g., a different number of jaws 814 may be desirable based on qualities of the wire 806, such as shape, size, material, etc.). The clamping mechanism 820 is operable to manipulate the wire 806, for example by rotating and advancing the wire 806. To rotate the wire 806, the clamping mechanism 820 includes a motor 802 that rotates the jaws 814. Such rotation allows the wire bending machine 800 to create bends in the wire 800 in any plane. To advance the wire, the clamping mechanism 820 is slidably mounted on a track 815. By clamping the wire 806 in the jaws 814, the clamping mechanism grasps the wire 806. To advance the wire, the clamping mechanism 820 is driven towards the bending head 810 while the wire is grasped in this manner. At the limit of the clamping mechanism's slidable travel, a pin (not shown) in the wire guide 816 secures the wire 806 while the clamping mechanism 820 releases the wire 806 by retracting the jaws 814 before the clamping mechanism 820 retracts away from the bending head 810. In one embodiment, the clamping mechanism retracts away from the bending head prior to loading a new wire to increase the amount of wire it can feed before arriving at the limit of the clamping mechanism's slidable travel.

The bending head 810 includes an outer portion 808. The outer portion 808 includes a cutting edge. The bending head 810 is movable in the vertical direction. Movement of the outer portion 808 in the vertical direction causes the outer portion 808 to extend toward and through the wire 806. The cutting edge of the outer portion 808 shears the wire 806 when the cutting edge pass through the wire 806.

The outer portion 808 rotates about the inner portion to bend the wire 806. The bending head 810 is driven by a bending head drive mechanism 850. The bending head drive mechanism 850 includes a first motor 822, a gearbox 824, one or more guide bearings 826, a second motor 832, a drive pulley 834, a driven pulley 830, and a belt 828. The first motor 822 drives vertical movement of the bending head 810. The first motor is (optionally) coupled to the gearbox 824 to more accurately control movement of the bending head 810. For example, the gearbox 824 can include a reduction gear. The first motor 822 drives a threaded shaft (e.g., the threaded shaft 836 depicted in FIG. 8B) that causes linear motion of a ball screw (e.g., the ball screw 838 depicted in FIG. 8B). The bending head 810 is seated on the ball screw. Consequently, rotation of the threaded shaft causes vertical movement of the ball screw as well as the bending head 810 seated on the ball screw.

The bending head drive mechanism 850 also drives rotational motion of the outer portion 808 to bend the wire 806. Specifically, the second motor 832 is mechanically coupled via a gearbox 833 to the drive pulley 834. A belt 828 couples the drive pulley 834 to the driven pulley 830. The outer portion 808 is coupled to the driven pulley 830 such that rotational motion of the second motor 832 causes rotational motion of the outer portion 808.

FIG. 8B is a sectional view of a bending head drive mechanism, according to some embodiments of the inventive subject matter. As can be seen in FIG. 8B, the first motor 822 is coupled to the threaded shaft 836 via the gearbox 824. Rotational motion of the first motor 822 causes the threaded shaft 836 to rotate and thus causes vertical movement of the ball screw 838. The bending head (e.g., the bending head 810 of FIG. 8A) rides on the ball screw 838. Consequently, vertical movement of the ball screw 838 causes vertical motion of the bending head. One or more guide bearings 826 provide support for the threaded shaft 836 by bracing the threaded shaft 836 with respect to one or more vertical supports 840.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in one or more of the following claims.

What is claimed is:

1. A method for generating a wire part program file to be used by a wire bending machine to generate a wire, the method comprising:

receiving a solid model file at a computing device;

displaying a representation of the solid model file using the computing device;

receiving user input at the computing device, the user input identifying at least three user selected points on a surface of the solid model file;

calculating a point in space for each of the at least three user selected points on the surface of the solid model file using the computing device, each point in space located at a predetermined distance normal to the surface of the solid model at the respective selected point;

calculating a wire shape using the computing device, wherein the wire shape passes through the point in space for each of the at least three user selected points;

automatically identifying a collision between the wire shape and the representation of the solid model file using the computing device;

adding a point to the wire shape to resolve the collision by;

identifying a point where the wire shape intersects with the surface of the solid model and adding a computer selected point at the location of the intersection, calculating a point in space for the computer selected point on the surface of the solid model file using the computing device, the point in space located at a predetermined distance normal to the surface of the solid model at the computer selected point;

calculating the wire shape using the computing device, wherein the wire shape passes through the point in space for each of the at least three user selected points and the point in space for the computer selected point; and generating, based on the user input, a wire part program file using the computing device.

2. The method of claim 1, further comprising:

exporting the wire part program file from the computing device to the wire bending machine; and forming a wire using the wire bending machine based on the wire shape file.

3. The method of claim 1, wherein the wire shape is an orthodontic arch wire.

4. The method of claim 3, wherein the solid model file is a digital representation of a patient's teeth.

5. The method of claim 1, wherein the wire part program file is based on a preexisting template and the at least three selected points on the surface of the solid model file correspond to points in the preexisting template.

6. The method of claim 5, further comprising calculating the location of one of the user selected points by:

receiving two user-identified prototypical points to respectively identify two teeth;

calculating a single point from the two user-identified prototypical points to identify a gap through which the wire shape needs to pass, where the gap lies between the two teeth.

7. A method for generating a wire, the method comprising:

receiving a solid model at a computing device;

receiving a preexisting template model of a wire shape, where the template defines at least one adjustable parameter configured such that the wire shape retains predetermined features of the template model after receiving user input;

receiving user input at the computing device, the user input identifying a plurality of user-selected points on a surface of the solid model, where two of the user-selected points correspond to the at least one adjustable parameter, and where the two user-selected points respectively identify two teeth in the solid model;

calculating a single calculated point from the two user-selected points, to identify a gap through which the wire shape will pass, where the gap lies between the two teeth;

calculating a wire shape by the computing device, where the wire shape passes through the single calculated point;

presenting, via a display device, a representation of the wire shape and a representation of the solid model;

generating a part program file by the computing device, the part program file comprising a series of steps required to form the wire shape;

exporting the part program file to a wire bending machine;

forming the wire by the wire bending machine according to the part program file.

8. The method of claim 7, the calculating a wire shape further comprising:

calculating by the computing device a point in space at a predetermined distance normal to the surface of the solid model for at least one of the plurality of user-selected points on the surface of the solid model.

9. The method of claim 7, where the continuous wire shape comprises a plurality of segments.

10. The method of claim 9, wherein the series of steps comprising the part program includes one or more step defining a length of wire to feed, a bending radius to apply to the wire, or a bending angle for each of the plurality of segments.

11. The method of claim 7, further comprising automatically identifying a collision between the wire shape and the representation of the solid model file using the computing device;

adding a point to the wire shape to resolve the collision by:

identifying a point where the wire shape intersects with the surface of the solid model and adding a computer selected point at the location of the intersection, calculating a point in space for the computer selected point on the surface of the solid model file using the computing device, the point in space located at a predetermined distance normal to the surface of the solid model at the computer selected point;

calculating the wire shape using the computing device, wherein the wire shape passes through the point in space for the computer selected point.

12. A system for generating a wire part program file, the system comprising:

a display device configured to display a representation of a solid model and a representation of a wire shape;

a user input device configured to operate in conjunction with the display device to allow a user to select a plurality of points on a surface of the representation of the solid model;

a processor device configured to:

receive the plurality of points selected by the user;

calculate a point in space located a predefined distance from the surface of the representation of the solid model and corresponding to one of the plurality of points on the surface of the representation of the solid model;

calculate a single point from two of the plurality of points, where the two of the plurality of points respectively identify two teeth, and where the single point identifies a gap through which the wire shape needs to pass, where the gap lies between the two teeth; and generate the representation of the wire shape for display on the display device, wherein the wire shape passes through the point in space and the single point;

an output port configured to transmit a wire part program file comprising a series of steps each providing a length of wire and a bend angle associated with the one or more point on the surface of the representation of the solid model.

13. The system of claim 12, the output port being operably coupled to a wire bending machine configured to generate a physical wire corresponding to the representation of the wire by performing operations corresponding to the series of steps.

14. The system of claim 12, further comprising:

a wire bending machine configured to receive the part program and to fabricate a physical wire corresponding to the representation of the wire by performing operations corresponding to the series of steps.

15. The system of claim 12, wherein the processor device is further configured to:
automatically identifying a collision between the wire shape and the representation of the solid model file;
add a point to the wire shape to resolve the collision by:
identifying a point where the wire shape intersects with the surface of the solid model and adding a computer selected point at the location of the intersection,
calculating a point in space for the computer selected point on the surface of the solid model file using the computing device, the point in space located at a predetermined distance normal to the surface of the solid model at the computer selected point;
re-generating the wire shape such that the wire shape additionally passes through the point in space for the computer selected point.

* * * * *